(12) United States Patent
Hayashi

(10) Patent No.: US 8,994,353 B2
(45) Date of Patent: Mar. 31, 2015

(54) POWER CONVERTER WITH A PULSE-WIDTH LIMITER THAT LIMITS A DRIVE SIGNAL PULSE WIDTH ACCORDING TO THE INPUT VOLTAGE

(71) Applicant: Denso Corporation, Kariya, Aichi-pref. (JP)

(72) Inventor: Yuji Hayashi, Kasugai (JP)

(73) Assignee: Denso Corporation, Kariya (JP)

( * ) Notice: Subject to any disclaimer, the term of this patent is extended or adjusted under 35 U.S.C. 154(b) by 264 days.

(21) Appl. No.: 13/628,406

(22) Filed: Sep. 27, 2012

(65) Prior Publication Data

US 2013/0076330 A1  Mar. 28, 2013

(30) Foreign Application Priority Data

Sep. 27, 2011  (JP) ................................. 2011-210269

(51) Int. Cl.
  *H02M 3/156*  (2006.01)
  *H02M 1/32*  (2007.01)
  *H02M 1/00*  (2006.01)

(52) U.S. Cl.
  CPC ............ *H02M 3/156* (2013.01); *H02M 1/32* (2013.01); *H02M 2001/0003* (2013.01)
  USPC ....................................... 323/285

(58) Field of Classification Search
  CPC ........ H02M 1/32; H02M 3/156; H02M 3/157
  USPC .................... 323/282–286; 363/50
  See application file for complete search history.

(56) References Cited

U.S. PATENT DOCUMENTS

| 2007/0210766 | A1* | 9/2007 | Borowy et al. | ................ 323/222 |
| 2010/0033992 | A1 | 2/2010 | Fukui et al. | |
| 2010/0289471 | A1* | 11/2010 | Kasai et al. | ................... 323/282 |
| 2011/0058287 | A1* | 3/2011 | Conseil | ........................... 361/18 |

FOREIGN PATENT DOCUMENTS

| JP | 2005-080336 | 3/2005 |
| JP | 2005-312105 | 11/2005 |
| JP | 2006-033958 | 2/2006 |
| JP | 2010-041832 | 2/2010 |

OTHER PUBLICATIONS

Office Action (1 page) dated Jul. 25, 2013, issued in corresponding Japanese Application No. 2011-210269 and English translation (1 page).

* cited by examiner

*Primary Examiner* — Harry Behm
(74) *Attorney, Agent, or Firm* — Nixon & Vanderhye PC

(57) ABSTRACT

A power converter includes a control circuit provided with a set signal generator, a current command generator, a reset signal generator, a drive signal generator, and a pulse-width limiter. The set signal generator generates a set signal at every predetermined cycle. The current command generator generates a current command based on an output voltage command and an output voltage. The reset signal generator generates a reset signal based on an input current and the generated current command. The drive signal generator generates a drive signal which turns on in synchronization with the generated set signal to turn on a switching element and which turns off in synchronization with the subsequently generated reset signal to turn off the switching element. The pulse-width limiter limits a pulse-width of the drive signal according to an input voltage and the output voltage, or according to the input voltage and the output voltage command.

20 Claims, 13 Drawing Sheets

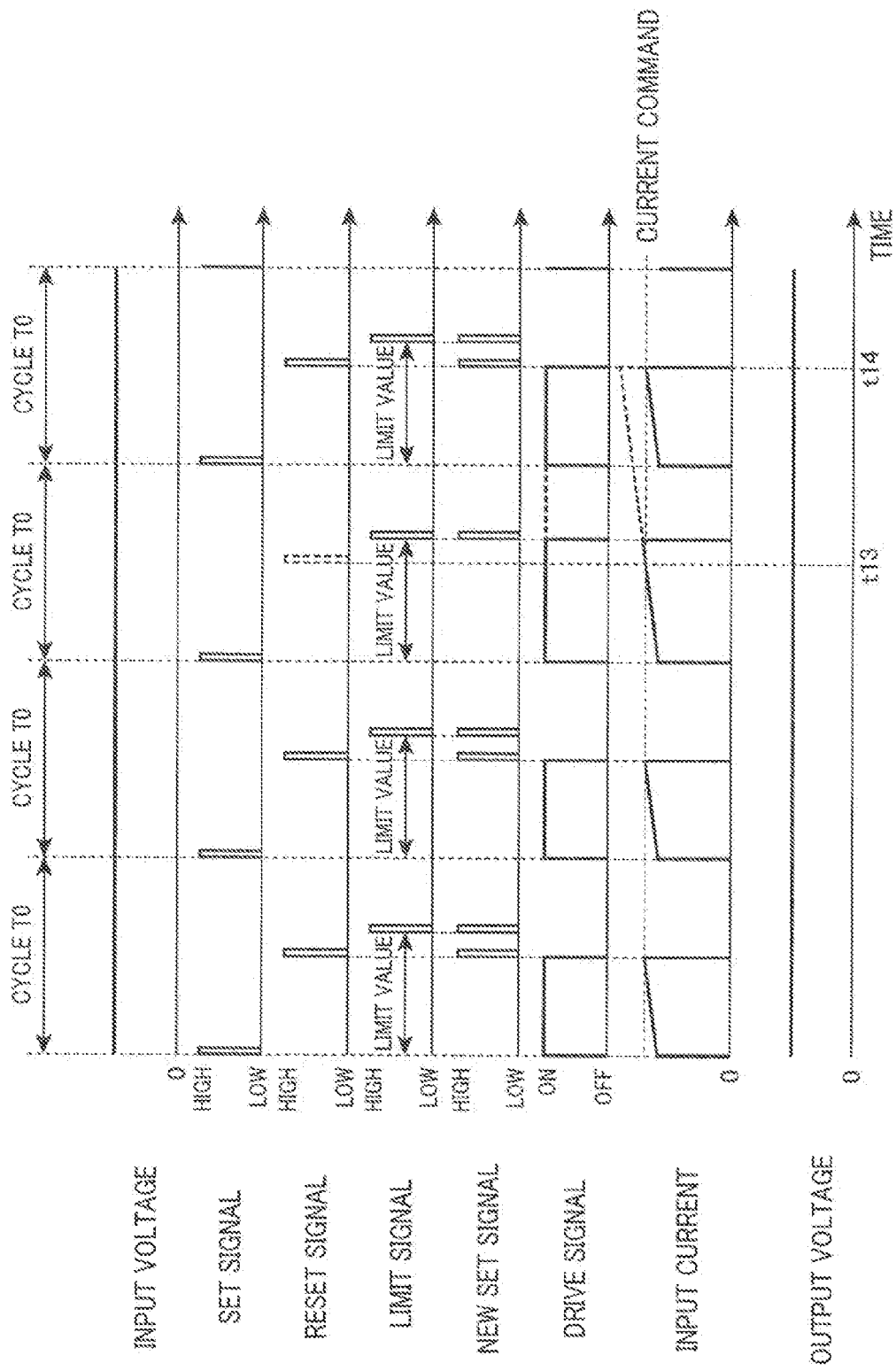

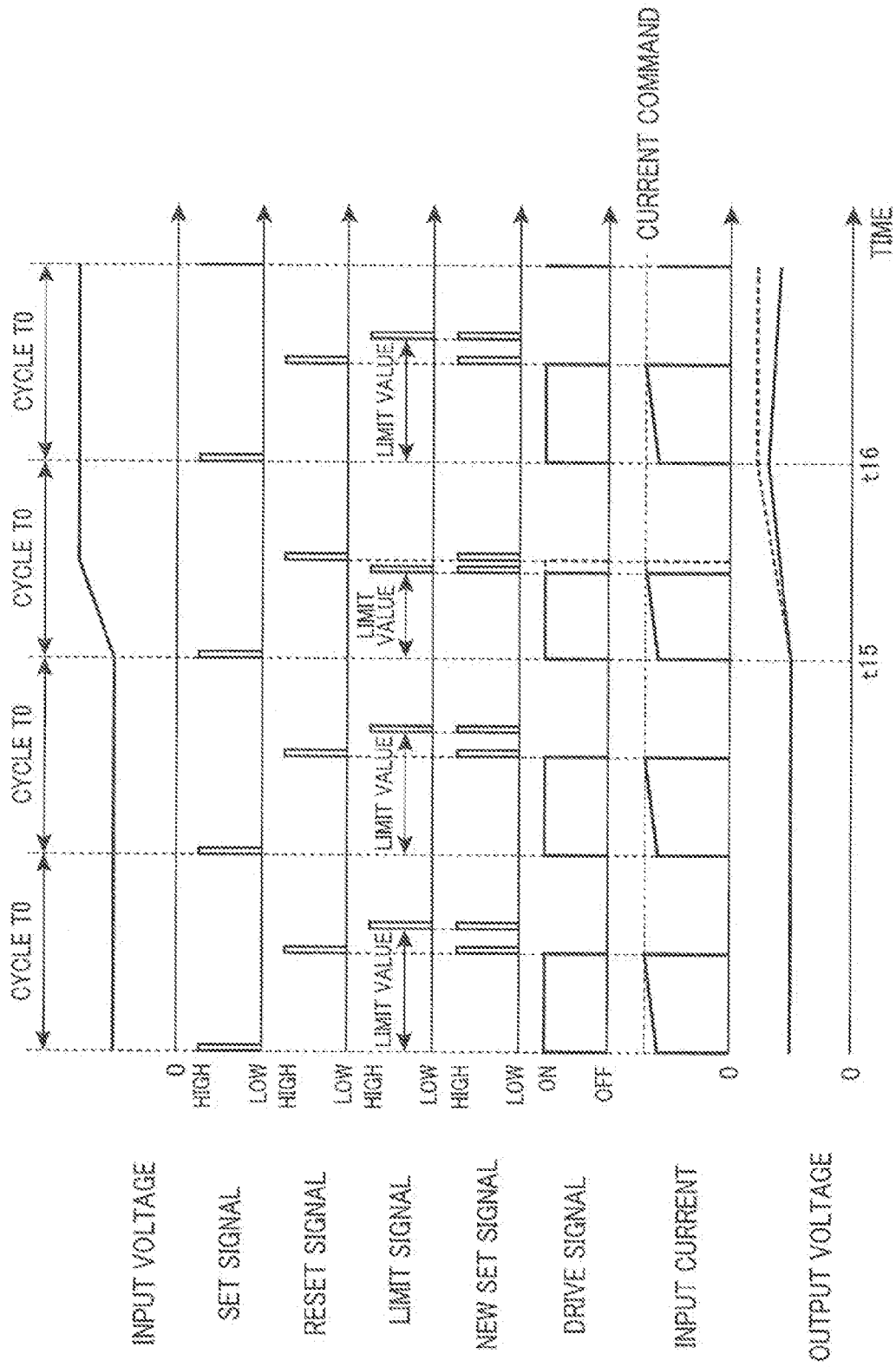

POWER CONVERTER WITH A PULSE-WIDTH LIMITER THAT LIMITS A DRIVE SIGNAL PULSE WIDTH ACCORDING TO THE INPUT VOLTAGE

CROSS-REFERENCE TO RELATED APPLICATION

This application is based on and claims the benefit of priority from earlier Japanese Patent Application No. 2011-210269 filed Sep. 27, 2011, the description of which is incorporated herein by reference.

BACKGROUND OF THE INVENTION

1. Technical Field

The present invention relates to a power converter, and in particular, to a power converter that determines a current command according to an output voltage and uses, as bases, the current command and an input current to generate a drive signal for driving a switching element.

2. Related Art

A power converter is well known, which determines a current command according to an output voltage and uses, as bases, the current command and an input current to generate a drive signal for driving a switching element. For example, JP-A-2006-033958 discloses a switching regulator as such a power converter.

This switching regulator includes an oscillator, an error amplifier, a comparator a RS flip-flop, and a switch. The oscillator outputs a set signal at every predetermined cycle. The error amplifier generates and outputs a current command based on a reference voltage, which corresponds to an output voltage command, and an output voltage. Specifically, the error amplifier obtains a difference between the reference voltage and the output voltage and outputs the difference as a current command. The comparator generates and outputs a reset signal based on the current command, which is outputted from the error amplifier, and an input current. Specifically, the comparator outputs a reset signal when an input current reaches a current instructed by the current command. The RS flip-flop generates and outputs a drive signal. The drive signal is turned on in synchronization with the set signal to turn on the switch. Also, the drive signal is turned off in synchronization with the reset signal received thereafter to turn off the switch. The switch is turned on/off according to the drive signals. Thus, the input voltage is converted to the voltage instructed by the output voltage command and the converted voltage is outputted.

In the switching regulator set forth above, if the error amplifier or the comparator has a failure or a malfunction, the reset signal is no longer outputted correctly. When a reset signal is not timely outputted, the switch is not timely turned off to allow the on-state to continue. Thus, the switch is overheated, due to overcurrent and breaks down.

Further, in the switching regulator set forth above, when the input voltage is increased, the output voltage is also increased accordingly. When the output voltage is increased, the error amplifier, the comparator and the RS flip-flop will adjust the drive signal so that the output voltage is suppressed from being increased. Therefore, even when the input voltage is increased, the increase in the output voltage is suppressed.

However, the error amplifier, the comparator and the RS flip-flop have their respective response delays. These response delays are accumulated before the drive signal is generated. Moreover, the input voltage is not taken into account in generating the drive signal. Therefore, when the input voltage is rapidly increased, the drive signal cannot be immediately adjusted in response to the drastic increase. In this case, the output voltage is inevitably increased.

SUMMARY

It is thus desired to provide a power converter which is able to prevent the occurrence of a failure due to the overheating of a switching element even if the means associated with generation of a reset signal have a failure or a malfunction, and is also able to suppress the increase of the output voltage when the input voltage is rapidly increased.

According to an exemplary aspect of the present disclosure, there is provided a power converter, comprising: a switching element that is driven to be turned on/off for converting one voltage to another; and a control circuit that controls driving of the switching element, wherein the control circuit includes: a set signal generator that generates a set signal at every predetermined cycle; a current command generator that generates a current command based, on an output voltage command and an output voltage outputted from the power converter; a reset signal generator that generates a reset signal based on an input current inputted to the power converter and the generated current command; a drive signal generator that generates a drive signal which turns on in synchronization with the generated set signal to thereby turn on the switching element, and which turns off in synchronisation with the subsequently generated reset signal to thereby turn off the switching element; and a pulse-width limiter that limits a pulse-width of the drive signal, according to an input voltage inputted to the power converter and the output voltage, or according to the input voltage and the output voltage command.

With this configuration, the pulse-width limiter limits the width of a pulse even if the current command generator or the reset signal generator associated with generation of a reset signal have a failure or a malfunction. Thus, the switching element is turned off. Accordingly, the power converter is unlikely to suffer from a failure that would be caused by the overheating of the switching element, which overheating accompanies the overcurrent of the switching element.

Also, the pulse-width limiter uses, as a basis, an input voltage in limiting the pulse width of a drive signal generated via the current command generator and the reset signal generator. Thus, when the input voltage is increased, the drive signal is immediately adjusted without being influenced by the response delay of the current command generator or the reset signal generator. Accordingly when the input voltage is rapidly increased, the output voltage is suppressed from being increased.

As explained above, according to the present disclosure, there is provided a power converter with a pulse-width limiter that limits the pulse-width of the drive signal according to the input voltage and the output voltage, or according to the input voltage and the output voltage command. The pulse-width limiter prevents the occurrence of a failure due to the overheating of the switching element even if the means associated with generation of the reset signal have a failure or a malfunction, or prevents increase of the output voltage even if the input voltage is rapidly increased.

The pulse-width limiter may include; a limit signal generator that determines a limit value of the pulse-width according to the input voltage and the output voltage, or according to the input voltage and the output voltage command, and that generates a limit signal which turns on in synchronisation with the set signal and has a pulse-width which defines the limit value; and a signal selector that selects the drive signal or the limit signal, whichever has a smaller pulse width, and outputs the selected signal as a new drive signal for driving the switching element.

With this configuration, the pulse width of the drive signal is reliably limited according to the input voltage and the output voltage, or according to the input voltage and the output voltage command.

The signal selector may exclude the drive signal having a pulse width of a predetermined value or less, select the drive signal or the limit signal, whichever has a smaller pulse width, and output the selected signal as the new drive signal for driving the switching element.

On the other hand, when the switching element is turned on, switching noise is generated immediately after that. If the switching noise is superposed on a reset signal, the drive signal generator takes the switching noise as a reset signal and turns off the drive signal in synchronization with the switching noise. Accordingly, the pulse width of the drive signal becomes smaller than the pulse width it should be.

With this configuration, however, the signal selector selects either a drive signal or a limit signal, whichever has a smaller pulse width, excluding the drive signal influenced by the switching noise and having a pulse width of not more than the predetermined value, and then outputs the selected signal as a new drive signal. Accordingly, the new drive signal is outputted without being influenced by the switching noise.

The pulse-width limiter may include; a limit signal generator that, determines a limit value of the pulse-width according to the input voltage and the output voltage, or according to the input voltage and the output voltage command, and that generates a limit signal when a predetermined period, with reference to the set signal elapses; and a signal synthesizer that synthesizes the reset signal with the limit signal and outputs the synthesized signal as a new reset signal for generating the drive signal.

With this configuration, the pulse width of the drive signal is reliably limited according to the input voltage and the output voltage, or according to the input voltage and the output voltage command.

The signal synthesizer may exclude the reset signal outputted within the predetermined period with reference to the set signal synthesize the reset signal with the limit signal, and output the synthesized signal as the new reset signal tor generating the drive signal.

On the other hand, when the switching element is turned on, switching noise is generated immediately after that. If the switching noise is superposed on the reset signal under the condition where the drive signal is turned off in synchronization with the reset signal as in the conventional art, the drive signal would have a smaller pulse width than it should have.

With this configuration, however, the signal synthesizer synthesizes a reset signal with a limit signal, excluding the reset signal superposed with the switching noise and outputted within the predetermined period with reference to the set signal, and then outputs the synthesized signal as a new reset signal. Thus, the new reset signal is outputted without being influenced by the switching noise. Accordingly, the drive signal is outputted without being influenced by the switching noise.

The power converter may be installed in a vehicle. With this configuration, the power converter installed in a vehicle will not suffer thorn a failure caused by the overheating of the switching element even if the current command generator or the reset signal generator associated with generation of a reset signal have a failure or a malfunction. Thus, when the input voltage is rapidly increased, the output voltage is suppressed from being increased.

BRIEF DESCRIPTION OF THE DRAWINGS

In the accompanying drawings:

FIG. 12 is a timing diagram illustrating an operation of the DC-DC converter in the case where a reset signal is not outputted due to a failure or a malfunction; and FIG. 13 is a timing diagram illustrating an operation of the DC-DC converter in the case where an input voltage is rapidly increased.

DETAILED DESCRIPTION OF THE PREFERRED EMBODIMENTS

With reference to the accompanying drawings, hereinafter are described some embodiments of the present invention. In each of the embodiments set forth below, a power converter according to the present invention is applied to a DC-DC converter which is installed in a vehicle to step down the voltage of a high-voltage battery to charge a low-voltage battery.

First Embodiment

Referring to FIG. 1 to 7, hereinafter is described a DC-DC converter 1 according to a first embodiment of the present invention. First, referring to FIGS. 1 and 2, the configuration of the DC-DC converter 1 is described.

Figure 1:
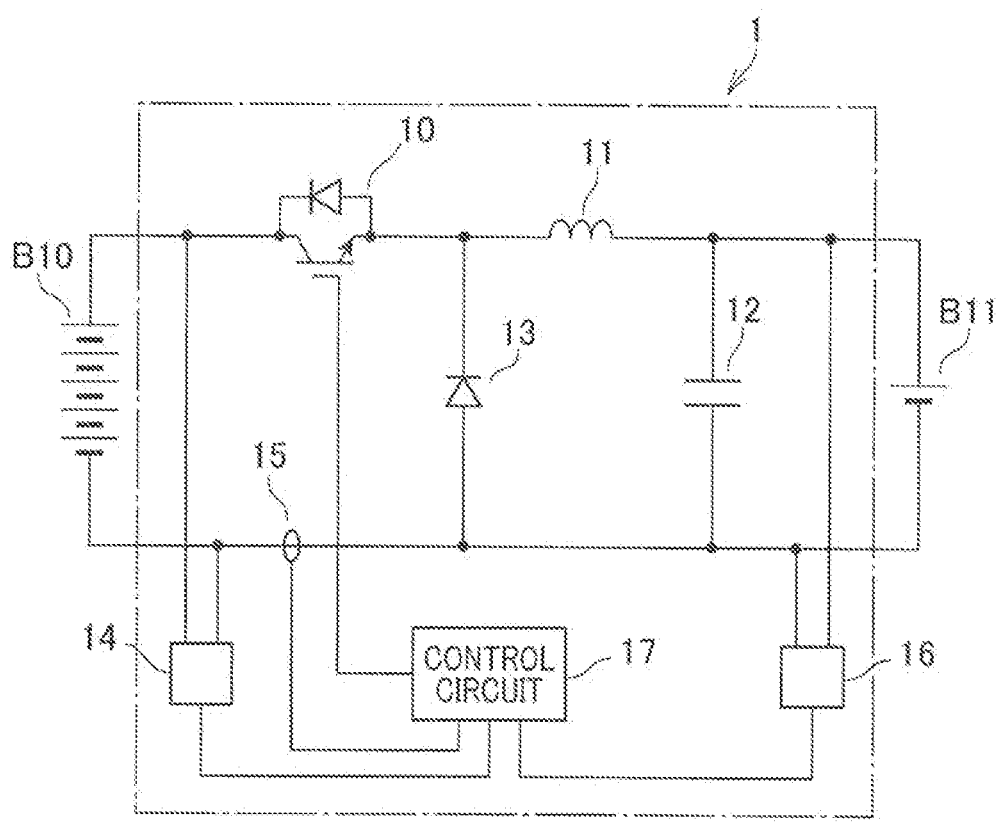
FIG. 1 is a circuit diagram illustrating a DC-DC converter according to a first embodiment of the present invention.

FIG. 1 is a circuit diagram of the DC-DC converter 1. As shown in FIG. 1, the DC-DC converter 1 (corresponding to the power converter) is an apparatus for stepping down a high DC voltage outputted from a high-voltage battery B10 to charge a low-voltage battery B11. The DC-DC converter 1 includes an IGBT (insulated gate bipolar transistor) 10 (corresponding to the switching element), a coil 11, a capacitor 12, a diode 13, an input voltage detection circuit 14, an input current detection circuit 15, an output voltage detection circuit 16, and a control circuit 17.

The IGBT 10 is an element that is turned on/off to have the coil 11 store and discharge energy. The IGBT 10 has a collector connected to a positive terminal of the high-voltage battery B10, and an emitter connected to the coil 11. Also, the IGBT 10 has a gate connected to the control circuit 17.

The coil 11 is an element that stores and discharges energy when current is passed therethrough, while inducing voltage. One end of the coil 11 is connected to the emitter of the IGBT 10 and the other end of the coil 11 is connected to the capacitor 12.

The capacitor 12 smoothes voltage at the other end of the coil 11. The capacitor 12 has a positive terminal connected to the other end of the coil 11, and a negative terminal connected to the negative terminal of the high-voltage battery B10. The positive and negative terminals of the capacitor 12 are also connected to the positive and negative terminals, respectively, of the low-voltage battery B11.

The diode 13 is an element that allows flywheel current to pass therethrough when the IGBT 10 is turned off to have the coil 11 discharged the stored energy. The diode 13 has an anode connected to the negative terminal of the capacitor 12. Also, the diode 13 has a cathode connected to a connecting point between the IGBT 10 and the coil 11, or specifically, connected to the emitter of the IGBT 10 and one end of the coil 11.

The input voltage detection circuit 14 is a circuit that detects an input voltage of the DC-DC converter 1. The input voltage detection circuit 14 converts the input voltage of the DC-DC converter 1 to a voltage that can be inputted to the control circuit 17 and outputs the converted voltage to the control circuit 17. The input voltage detection circuit 14 has an input terminal connected to the collector of the IGBT 10 and another input terminal connected to the negative terminal of the capacitor 12 and the anode of the diode 13. The input voltage detection circuit 14 also has an output terminal connected to the control circuit 17.

The input current detection circuit 15 is a circuit that detects an input current of the DC-DC converter 1. The input current detection circuit 15 converts the input current of the DC-DC converter 1 to a voltage that can be inputted to the control circuit 17 and outputs the converted voltage to the control circuit 17. The input current of the DC-DC converter 1 passes through the IGBT 10 or the coil 31 when the IGBT 10 is turned on. The input current detection circuit 15 is made up of a clamp-type current sensor and arranged on a line that connects the negative terminal of the capacitor 12 and the anode of the diode 13 to the high-voltage battery B10. The input current detection circuit 15 has an output terminal connected to the control circuit 17.

The output voltage detection circuit 16 is a circuit that detects an output voltage of the DC-DC converter 1. The output voltage detection circuit 16 converts the output voltage of the DC-DC converter 1 to a voltage that can be inputted to the control circuit 17 and outputs the converted voltage to the control circuit 17. The output voltage detection circuit 16 has an input terminal connected to the positive terminal of the capacitor 12 and another input terminal connected to the negative terminal of the capacitor 12. The output voltage detection circuit 16 also has an output terminal connected to the control circuit 17.

The control circuit 17 is a circuit that controls driving of the IGBT 10, based on the input voltage, the input current and the output voltage of the DC-DC converter 1, so that a step-down operation is carried out.

Figure 2:
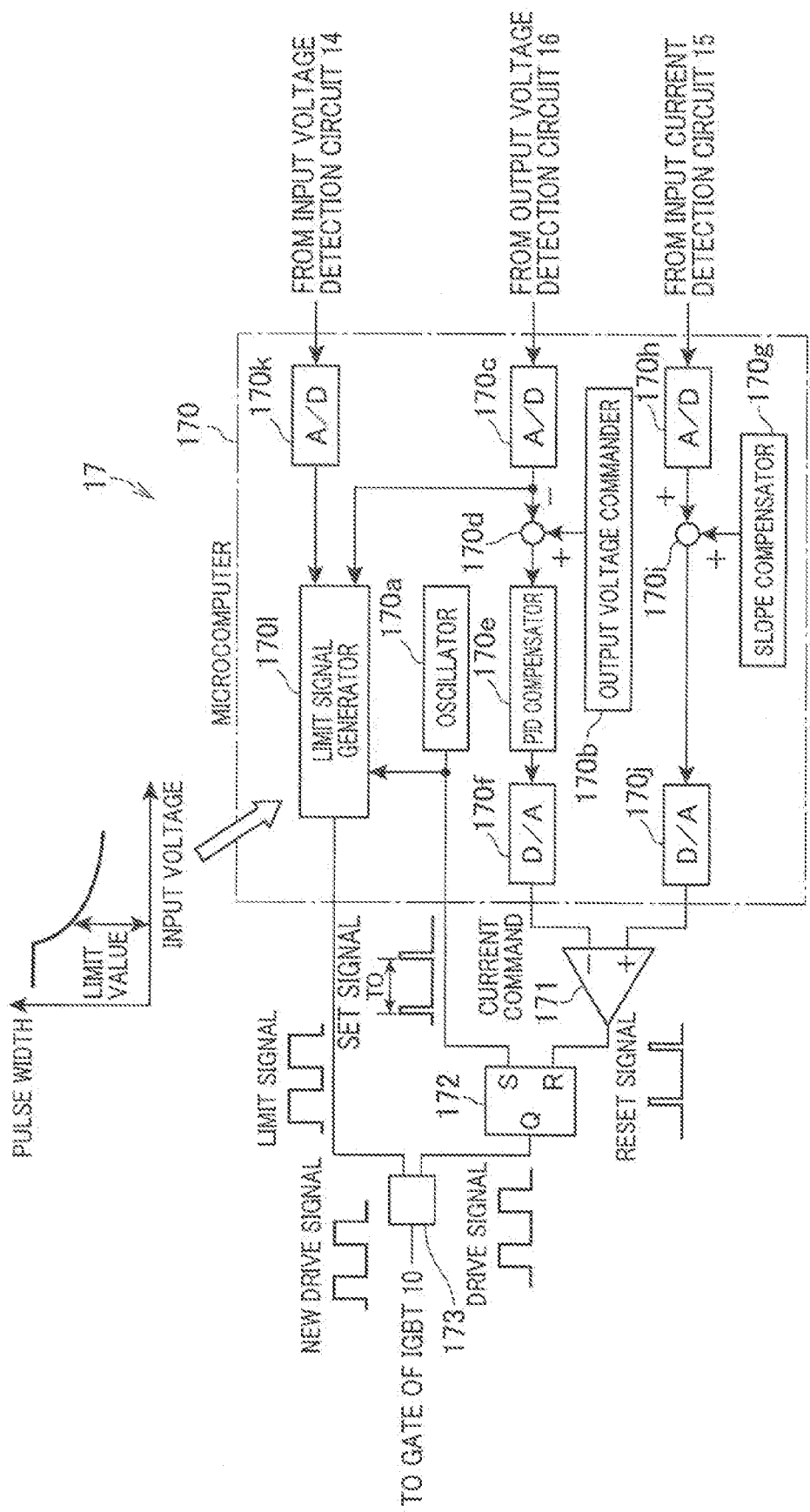
FIG. 2 is a circuit diagram illustrating a control circuit illustrated in FIG. 1.

FIG. 2 is a circuit diagram of the control circuit 17. As shown in FIG. 2, the control circuit 17 includes a microcomputer 170, comparator 171 (corresponding to the reset signal generator), an RS flip-flop 172 (corresponding to the drive signal generator), and a signal selection circuit 173 (corresponding to the pulse-width limiter and the signal selector).

The microcomputer 170 is an element that generates and outputs various signals necessary for generating a signal with which the IGBT 10 is driven, based on the input voltage, the input current and the output voltage of the DC-DC converter 1. The microcomputer includes an oscillator 170a (corresponding to the set signal generator), an output voltage commander 170b, A/D converter 170c, a subtractor 170d (corresponding to the current command generator), a PID (proportional-integral-derivative) compensator 170e (corresponding to the current command generator), a D/A converter 170f (corresponding to the current command generator), slope compensator 170g, an A/D converter 170h, an adder 170i, a D/A converter 170j, an A/D converter 170k, and a limit signal generator 170l (corresponding to the pulse-width limiter and the limit signal generator).

The oscillator 170a, the A/D converters 170c, 170h and 170k, and the D/A converters 170f and 170j are configured in the form of circuits. On the other hand, the output voltage commander 170b, the subtractor 170d, the PID compensator 170e, the slope compensator 170g, the adder 170i, and the limit signal generator 170l are configured in the form of programs.

The oscillator 170a outputs a pulsed set signal whose signal level is high at every cycle T0 (every predetermined cycle). The oscillator 170a has an output terminal connected to the RS flip-flop.

The output voltage commander 170b is a block that outputs an output voltage command as a digital value. Specifically, the output voltage commander 170b outputs an optimum voltage, in the form of an output voltage command, for charging me low-voltage battery B11. The output voltage commander 170b is connected to the subtractor 170d.

The A/D converter 170c is a circuit that converts the voltage outputted from the output voltage detection circuit 10 to a digital value. The A/D converter 170c has an input terminal connected to an output terminal of the output voltage detection circuit 16, and an output terminal connected to the subtractor 170d and the limit signal generator 170l.

The subtractor 170d is a block that outputs, as a digital value, a difference in the output between the output voltage commander 170b and the A/D converter 170e. The subtractor 170d is connected to the output voltage commander 170b, the A/D converter 170c and the PID compensator 170e.

The PID compensator 170e is a block that carries out proportional, integral and derivative calculations with respect to the output of the subtractor 170d and outputs, as a digital value, the result of the calculation. The PID compensator 170c is connected to the subtractor 170d and the D/A converter 170f.

The D/A converter 170f is a circuit that converts the output of the PID compensator 170c to a voltage, as an analog value, and outputs the converted voltage in the form of a current command. The D/A converter 170f is connected to the PID compensator 170e and the comparator 171.

The A/D converter 170h is a circuit that converts the voltage outputted from the input current detection circuit 15 to a digital value. The A/D converter 170h has an input terminal connected to an output terminal of the input current detection circuit 15, and an output terminal connected to the adder 170i.

The slope compensator 170g is a block that outputs, as a digital value, a slope compensation value to prevent subharmonic oscillation. The slope compensator 170g is connected to the adder 170i.

The adder 170i is a block that adds the output from the slope compensator 170g to tire output from the A/D converter 170*h* and outputs, as a digital value, the result of the addition. The adder 170*i* is connected to the slope compensator 170*g*, the A/D converter 170*h* and the D/A converter 170*j*.

The D/A converter 170*j* is a circuit that converts the output from the adder 170*i* to a voltage, as an analog value, and outputs the converted voltage as an input current. The D/A converter 170*j* has an input terminal connected to the adder 170*i*, and an output terminal connected to the comparator 171.

The A/D converter 170*k* is a circuit that converts the voltage outputted from the input voltage detection circuit 14 to a digital value. The A/D converter has an input terminal connected to an output terminal of the input voltage detection circuit 14, and an output terminal connected to the limit signal generator 170*l*.

The limit signal generator 170*l* is a block that uses, as inputs, the outputs from the A/D converters 170*c* and 170*k* to determine a limit value of the pulse width, of a pulse signal for turning on the IGBT 10. Further, the limit signal generator 170*l* generates and outputs a limit signal, which is turned on synchronizing with a set signal and has a pulse width corresponding to the limit value. Specifically, the limit signal generator 170*l* determines a limit value of a pulse width referring to a map.

The map shows a relationship between the outputs of the A/D converters 170*c* and 170*k*, predetermined input/output voltage of the DC-DC converter 1, and maximum pulse width tolerable as a pulse signal for turning on the IGBT 10. Further, in the map, this relationship is specified for each output voltage of the DC-DC converter 1.

Thus, the limit signal generator 170*l* generates and outputs a limit signal which is turned on synchronizing with a set signal and has a pulse width, corresponding to the limit value. The limit signal generator 170*l* is connected to the oscillator 170*a*, the A/D converters 170*c* and 170*k*, and the signal selection circuit 173.

The comparator 171 is an element that outputs a reset signal based, on the outputs of the D/A converters 170*f* and 170*j*. Specifically, the comparator 171 outputs a pulsed reset signal whose signal level is high when the output of the D/A converter 170*j* reaches the output of the D/A converter 170*f*.

The comparator 171 has an inverting input terminal connected to an output terminal of the D/A converter 170*f*, and a non-inverting input terminal connected to an output terminal of the D/A converter 170*j*. Further, the comparator 171 has an output terminal connected to the RS flip-flop 172.

The RS flip-flop 172 is an element that generates and outputs a drive signal. The drive signal is turned on synchronizing with a set signal to turn on the IGBT 10, and then turned off synchronizing with a reset signal inputted from the comparator 171 to turn off the IGBT 10. Specifically, the RS flip-flop 172 generates and outputs a drive signal which is turned on synchronizing with a rising edge of a set signal and turned off synchronizing with a rising edge of a reset signal.

The RS flip-flop 172 has a set signal input terminal connected to an output terminal of the oscillator 170*a*, and a reset signal input terminal connected to an output terminal of the comparator 171. The RS flip-flop 172 also has an output terminal connected to the signal selection circuit 173.

The signal selection circuit 173 is a circuit that excludes a drive-signal having a pulse width of W0 or less (not more than a predetermined value) and selects a drive signal or a limit signal, whichever has a smaller pulse width. Then, the signal selection circuit 173 outputs the selected signal as anew drive signal for driving the IGBT 10. In this case, W0 indicates a time from when the IGBT 10 is turned on until when the influence of switching noise is settled, which is generated when the IGBT 10 is turned on.

The signal selection circuit 173 has an input terminal connected to an output terminal of the RS flip-flop 172, and another input terminal connected to the limit signal generator 170*l*. The signal selection circuit 173 also has an output terminal connected to the gate of the IGBT 10.

Referring now to FIGS. 1 to 7, hereinafter is described an operation of the DC-DC converter 1.

Figure 3:
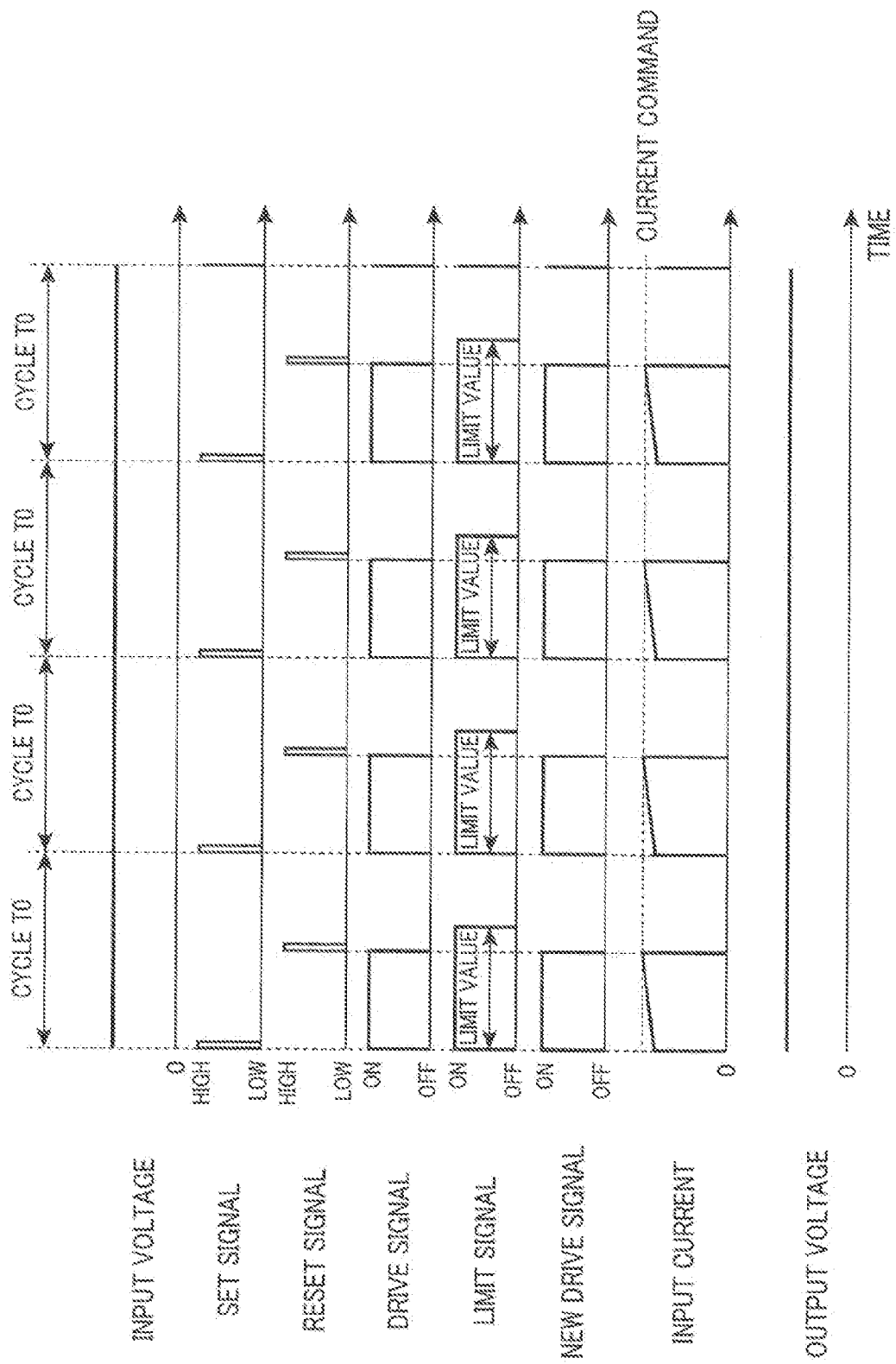
FIG. 3 is a timing diagram illustrating an operation of the DC-DC converter.

FIG. 3 is a timing diagram illustrating an operation of the DC-DC converter 1 according to the first embodiment. As shown in FIG. 3, the oscillator 170*a* shown in FIG. 2 outputs a pulsed set signal whose signal level is high at every cycle T0.

The voltage commander 170*b* shown in FIG. 2 outputs an output voltage command as a digital value. The A/D converter 170*c* converts a voltage outputted from, the output voltage detection circuit 16 into a digital value. In this case, the voltage corresponds to an output voltage of the DC-DC converter 1. The subtractor 170*d* outputs, as a digital value, a difference in the output between the output voltage commander 170*b* and the A/D converter 170*c*. The PID compensator 170*e* carries out proportional, integral and derivative calculations with respect to the output of the subtractor 170*d* and outputs, as a digital value, the result of the calculation.

Then, the D/A converter 170*f* converts the output of the PID compensator 170*e* into a voltage, as an analog value, and outputs the voltage as a current command. In other words, the D/A converter 170*f* issues a current command on the basis of the output voltage command and the output voltage of the DC-DC converter 1 and outputs the current command as a voltage corresponding to a current command.

The A/D converter 170*h* converts a voltage outputted from the input current detection circuit 15 into a digital value. In this case, the voltage corresponds to an input current of the DC-DC converter 1. The slope compensator 170*g* outputs, as a digital value, a slope compensation value for preventing subharmonic oscillation. The adder 170*i* adds the output from the slope compensator 170*g* to the output from the A/D converter 170*h* and outputs the addition value as a digital value.

Then, the D/A converter 170*j* converts the output from, the adder 170*i* into a voltage, as an analog value, and outputs the voltage as a voltage corresponding to the input current of the DC-DC converter 1. In other words, the D/A converter 170*j* outputs the slope-compensated input current, as a voltage corresponding to the input current of the DC-DC converter 1.

As shown in FIG. 3, the comparator 171 outputs a pulsed reset signal whose signal level is high when the voltage corresponding to an input current outputted from the D/A converter 170*j* reaches the voltage corresponding to a current command outputted from the D/A converter 170*f*.

As shown in FIG. 3, the RS flip-flop 172 shown in FIG. 2 generates and outputs a drive signal. The drive signal is turned on synchronizing with the rising edge of a set signal to turn on the IGBT 10, and then turned off synchronizing with the rising edge of a reset signal inputted front the comparator 171 to turn off the IGBT 10.

The A/D converter 170*k* shown in FIG. 2 converts a voltage outputted from the input voltage detection circuit 14 into a digital value. In this case, the voltage corresponds to an input voltage of the DC-DC converter 1.

The limit signal generator 170*l* refers to a map and determines a limit value of a pulse width. The map shows, for each output voltage of the DC-DC converter 1, a relationship between a voltage corresponding to the output voltage of the DC-DC converter 1 outputted from the A/D converter 170*c*; a voltage corresponding to the input voltage of the DC-DC converter 1 outputted from the A/D converter 170*k*; a preset input voltage of the DC-DC converter 1; and a maximum pulse width tolerable as a pulse signal for turning on the IGBT 10.

Then, as shown in FIG. 3, the limit signal generator 170*l* generates and outputs a limit signal which is turned on synchronizing with a set signal and has a pulse width corresponding to the limit value.

As shown in FIG. 3, the signal selection circuit 173 shown in FIG. 2 selects either a drive signal or a limit signal, whichever has a smaller pulse width, and outputs the selected signal as a new drive signal for driving the IGBT 10. As far as the blocks or circuits associated with generation of a reset signal are in normal operation, the pulse width of the drive signal will not become larger than the pulse width of the limit signal. Accordingly, the signal selection circuit 173 selects and outputs the drive signal as a new drive signal for driving the IGBT 10.

The IGBT 10 shown in FIG. 3 is turned on/off according to the new drive signals outputted from the signal selection circuit 173. When the IGBT 10 is turned on, energy from the high-voltage battery B10 is stored in the coil 11. Then, when the IGBT 10 is turned off, the energy stored in the coil 11 is discharged.

In this case, the coil 11 has a higher potential at its end E2 connected to the capacitor 12 than at its end E1 connected to the IGBT 10. In other words, the voltage of the coil 11 at the end E2 becomes lower than the voltage of the high-voltage battery 10. Since the IGBT 10 is in an off-state, the current accompanying the discharge of the energy stored in the coil 11 flows to the low-voltage battery B11 via the diode 13 to charge the low-voltage battery 11.

Thereafter, the similar operation is repeated, so that the voltage of the low-voltage battery 11 is kept at the level of the voltage instructed by the output voltage command.

Figure 4:
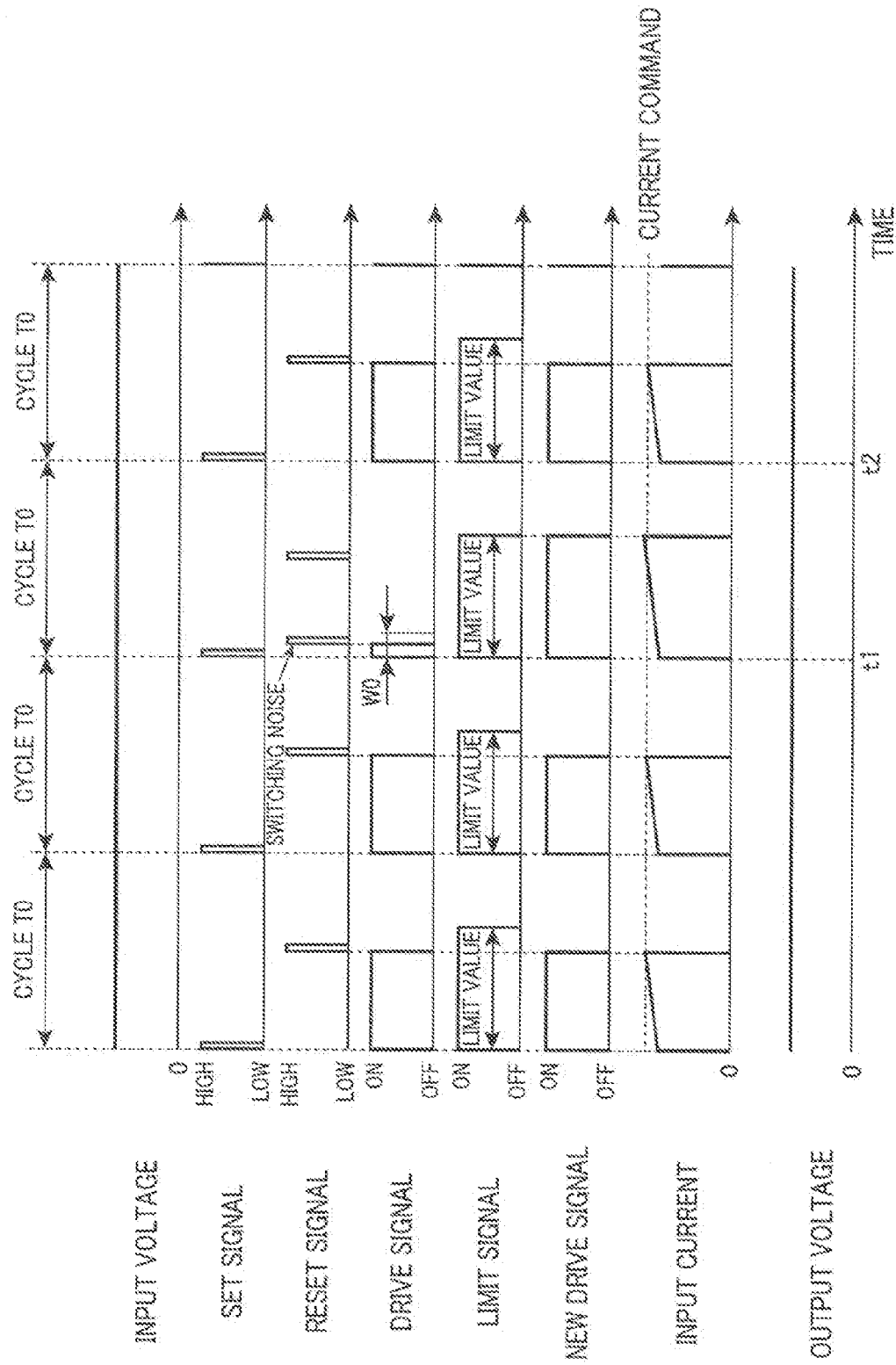
FIG. 4 is a timing diagram illustrating an operation of the DC-DC converter in the case where switching noise is superposed over the output of a comparator.

FIG. 4 is a timing diagram illustrating an operation of the DC-DC converter 1 in the case where switching noise is superposed over the output of the comparator 171.

When the IGBT 10 shown in FIG. 1 is turned on, switching noise is generated immediately after that. If the switching noise is superposed on a reset signal, as shown in FIG. 4, the RS flip-flop 172 takes the switching noise as a reset signal and turns off the drive signal in synchronisation with the switching noise. Accordingly, the pulse width of the drive signal becomes smaller than the pulse width it should originally be.

However, the signal selection circuit 173 selects either a drive signal or a limit signal, whichever has a smaller pulse width, excluding the drive signal influenced by the switching noise and having a pulse width of not more than W0 to, and outputs the selected signal as a new drive signal for driving the IGBT 10.

Thus, as shown in FIG. 4, when the pulse width of a drive signal becomes smaller than W0 due to the influence of the switching noise, the signal selection circuit 173 selects and outputs a limit signal as a new drive signal. In this way, a new drive signal is outputted without being influenced by the switching noise of the IGBT 10.

Figure 5:
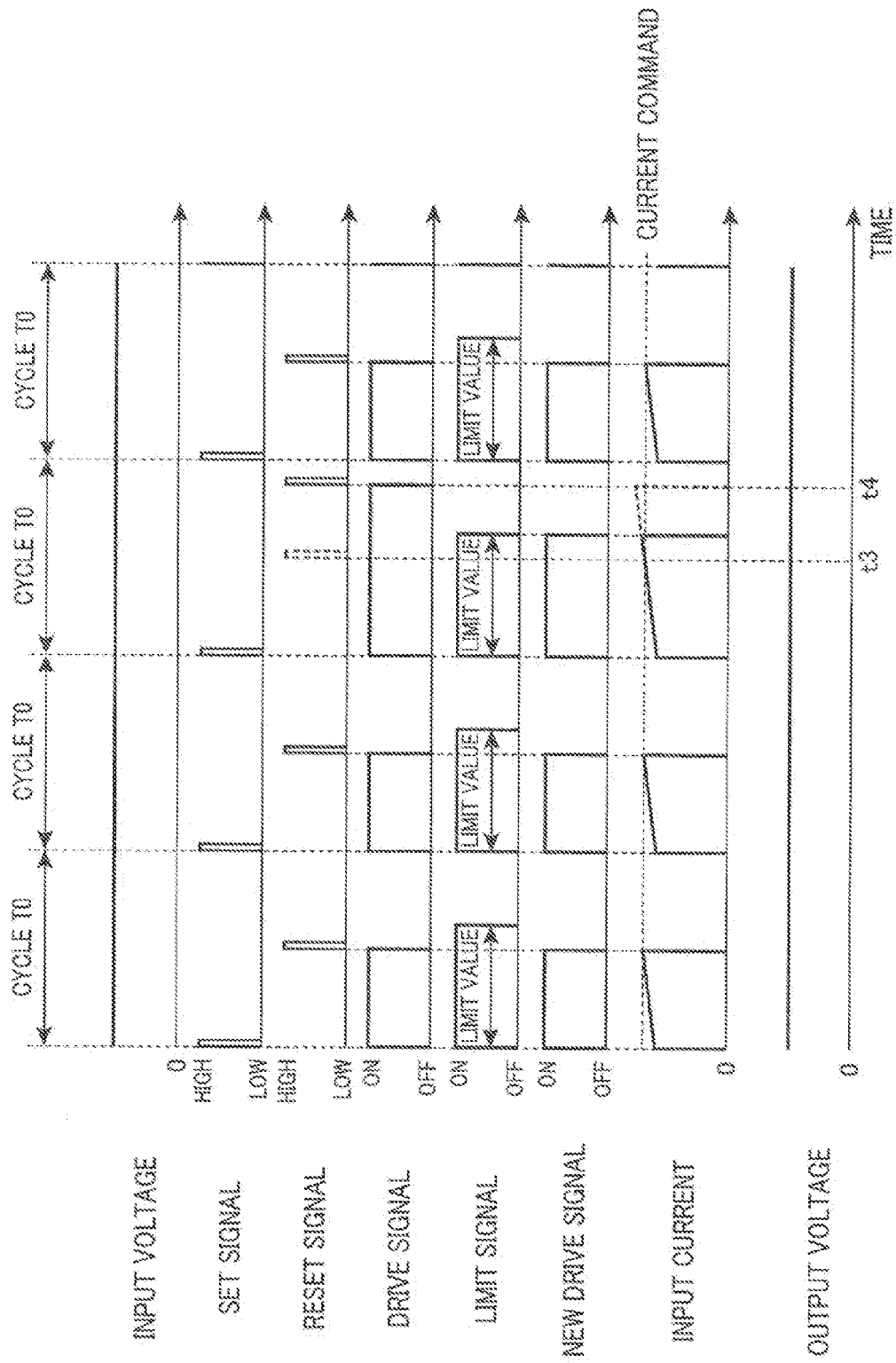
FIG. 5 is a timing diagram illustrating an operation of the DC-DC converter in the case where an output timing of a reset signal is delayed due to a failure or a malfunction.

FIG. 5 is a timing diagram illustrating an operation of the DC-DC converter 1 in the case where an output timing of a reset signal is delayed due to a failure or a malfunction.

As shown in FIG. 5, when a failure or a malfunction occurs in the blocks or circuits associated with generation of a reset signal, the output timing of a reset signal that should be outputted at time t3 may be delayed but outputted at time t4. In this case, the pulse width of the drive becomes larger than the pulse width of the limit signal. If the IGBT 10 is turned on/off according to drive signals as in the conventional art, the input current would inevitably become large as shown by the broken line in FIG. 5.

However, in this case, as shown in FIG. 5, the signal selection circuit 173 selects and outputs, as a new drive signal, a limit signal having a smaller pulse width than the drive signal. Accordingly, as shown by the solid line in FIG. 5, the input current is suppressed from becoming large.

Figure 6:
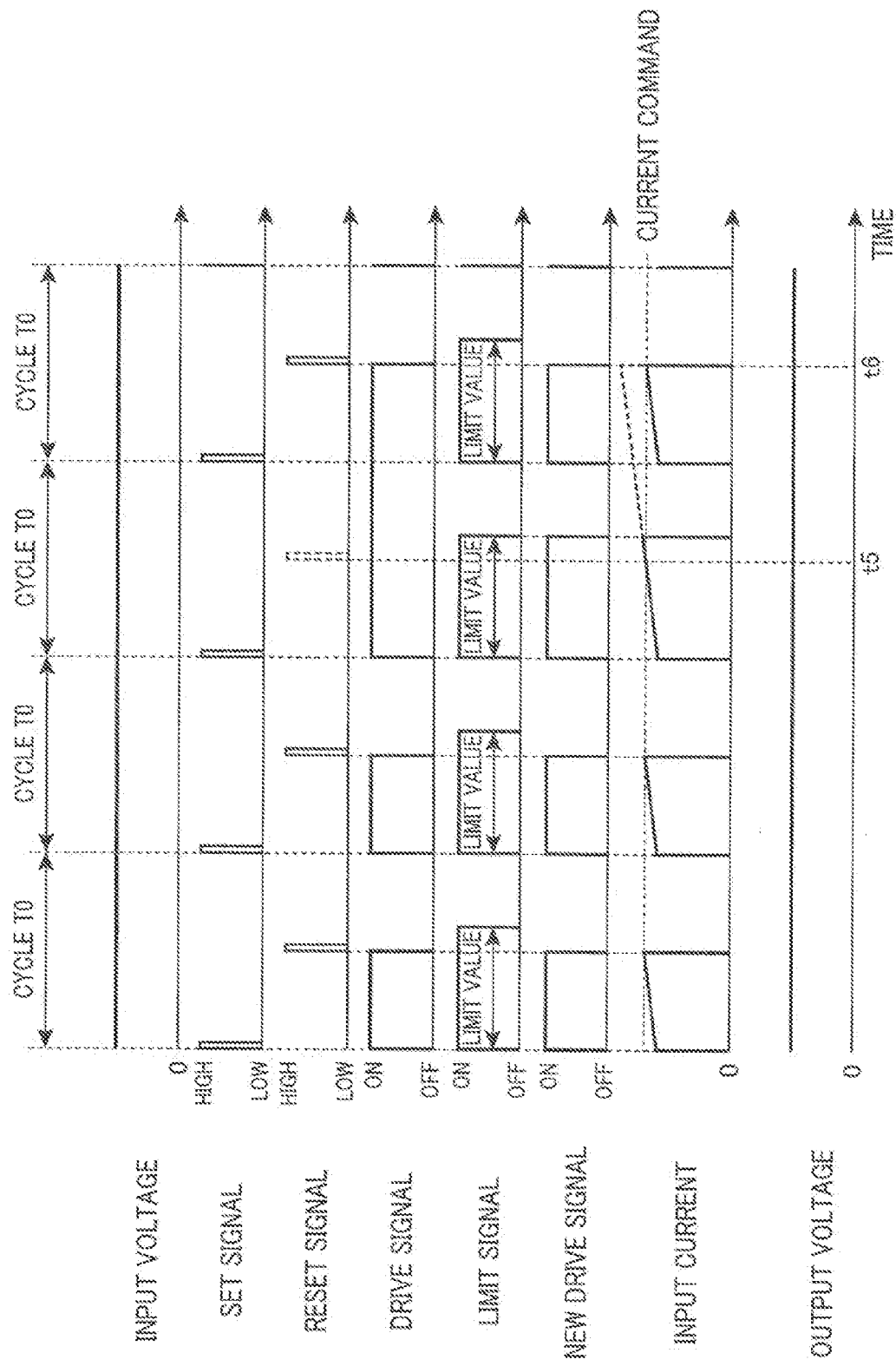
FIG. 6 is a timing diagram illustrating an operation of the DC-DC converter in the case where a reset signal is not outputted due to a failure or a malfunction.

FIG. 6 is a timing diagram illustrating an operation of the DC-DC converter 1 in the case where a reset signal is not outputted due to a failure or a malfunction.

As shown in FIG. 6, when a failure or a malfunction occurs in the blocks or circuits associated with generation of a reset signal, no reset signal may be outputted, which should be outputted at time t5. In this case, the on-state of the drive signal is kept until the subsequent reset signal is outputted, if the IGBT 10 is turned on/off according to drive signals as in the conventional art, the input current inevitably would become extraordinarily large as shown by the broken line in FIG. 6.

However, in this case, as shown in FIG. 6, the signal selection circuit 173 selects and outputs, as a new drive signal a limit signal having a smaller pulse width than the drive signal. Accordingly, as shown by the solid line in FIG. 6, the input current is suppressed from becoming large.

Figure 7:
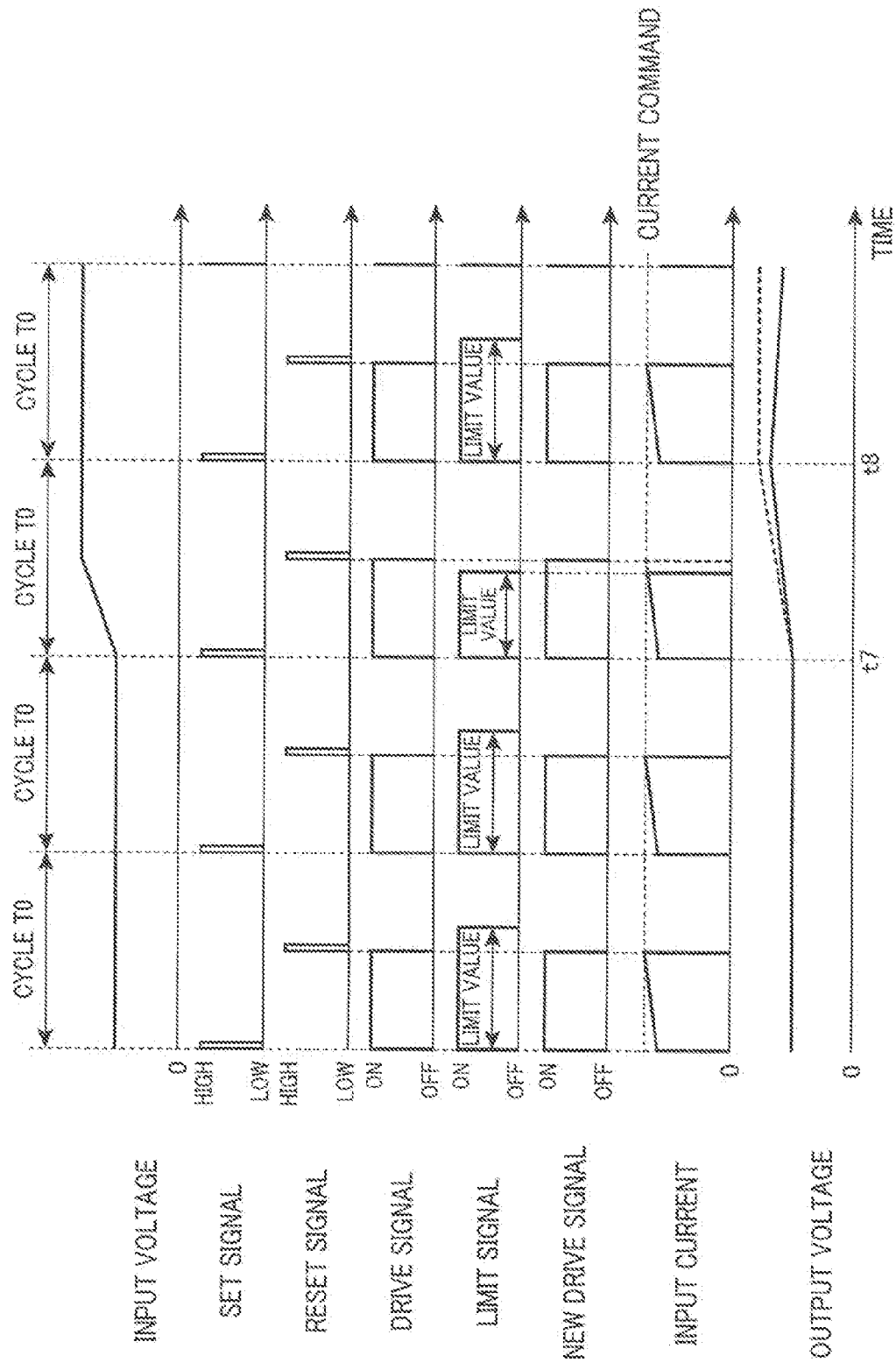
FIG. 7 is a timing diagram illustrating an operation of the DC-DC converter in the case where an input voltage is rapidly increased.

FIG. 7 is a timing diagram illustrating an operation of the DC-DC converter 1 in the case where an input voltage is rapidly increased.

As shown in FIG. 7, the input voltage of the DC-DC converter 1 may be rapidly increased during a period from time t7 to time t8. In this case, the blocks or circuits associated with generation of a reset signal may have a delay in responding to the drastic increase of the input voltage, and thus the pulse width of the drive signal will not be immediately reduced. If the IGBT 10 is turned on/off according to drive signals as in the conventional art, the output voltage would be inevitably increased as shown by the broken line in FIG. 7.

However, when the input voltage is increased, the limit, signal generator 170*l* refers to the map and immediately reduces the limit value of the pulse width. Then, the limit signal generator 170*l* generates and outputs a limit signal having a pulse width corresponding to the reduced limit value.

Specifically, as shown in FIG. 7, with the increase of the input voltage, the pulse width of the limit signal is immediately reduced. Thus, as shown in FIG. 7, the signal selection circuit 173 selects and outputs, as a new drive signal, a limit signal having a smaller pulse width than the drive signal having a pulse width which has not been reduced due to the response delay. Accordingly, as shown by the solid line in FIG. 7, the output voltage is suppressed from being increased.

Next, advantageous effects of the first embodiment are described below.

According to the first embodiment, the limit signal generator 170*l* and the signal selection circuit 173 play a role of limiting the pulse width of a drive signal even if a failure or a malfunction occurs in the blocks or circuits associated with generation of a reset signal in the microcomputer 170. Thus, the IGBT 10 can be turned off. In this way, the DC-DC converter 1 installed in the vehicle can avoid a failure caused by the overheating of the IGBT 10, which is ascribed to its overcurrent.

Further, the limit signal generator 170*l* and the signal selection circuit 173 limit the pulse width of a drive signal according to the input voltage of the DC-DC converter 1. The drive signal is generated via the blocks or circuits hi the microcomputer 170, which generate a current command, and via the comparator 171 that outputs a reset signal. Accordingly, when the input voltage of the DC-DC converter 1 is increased, the drive signal is immediately adjusted without being influenced by the response delay of the blocks or circuits in the microcomputer 170, and the comparator 171. Thus, in the DC-DC converter 1 installed in the vehicle, the output voltage is hardly increased when the input voltage is rapidly increased.

According to the first embodiment, the limit signal generator 170*l* uses, as bases, the input and output voltages of the DC-DC converter 1 in determining a limit value of the pulse width of a pulse signal for turning on the IGBT 10. Then, the limit signal generator 170*l* generates a limit signal which is turned on synchronizing with a set signal and has a pulse width corresponding to the limit value. The signal selection circuit 173 selects either a drive signal or a limit signal, whichever has a smaller pulse width, and outputs the selected signal as a new drive signal for driving the IGBT 10. Accordingly, the pulse width of the drive signal is reliably limited according to the input and output voltages of the DC-DC converter 1.

On the other hand, when the IGBT 10 is turned on, switching noise is generated immediately after that. If the switching noise is superposed on a reset signal, the RS flip-flop 172 takes the switching noise as a reset signal and thus turns off the drive signal in synchronization with the switching noise. As a result the pulse width of the drive signal becomes smaller than the pulse width it should be.

In this regard, according to the first embodiment, the signal selection circuit 173 selects either a drive signal or a limit signal, whichever has a smaller pulse width, excluding the drive signal influenced by the switching signal and having a pulse width of not more than W0 to, and outputs the selected signal as a new drive signal. Accordingly, a new drive signal is outputted without being influenced by the switching noise of the IGBT 10.

Second Embodiment

Referring now to FIGS. 8 to 13, hereinafter is described a DC-DC converter according to a second embodiment of the present invention. In the second embodiment, the components identical with or similar to those in the first embodiment are given the same reference numerals for the sake of omitting unnecessary explanation.

The DC-DC converter according to the second embodiment is different from that of the first embodiment as follows. Specifically, in the DC-DC converter of the first embodiment, a new drive signal is generated on the basis of a limit signal having a pulse width of a limit value and a drive signal.

In this regard, in the DC-DC converter of the second embodiment, a new reset signal is generated on the basis of a limit signal and a reset signal, so that a drive signal is generated based on the new reset signal. In this case, the limit signal is outputted after lapse of a time corresponding to the limit value of a pulse width. The DC-DC converter of the second embodiment has a configuration similar to that of the first embodiment, except the control circuit.

Figure 8:
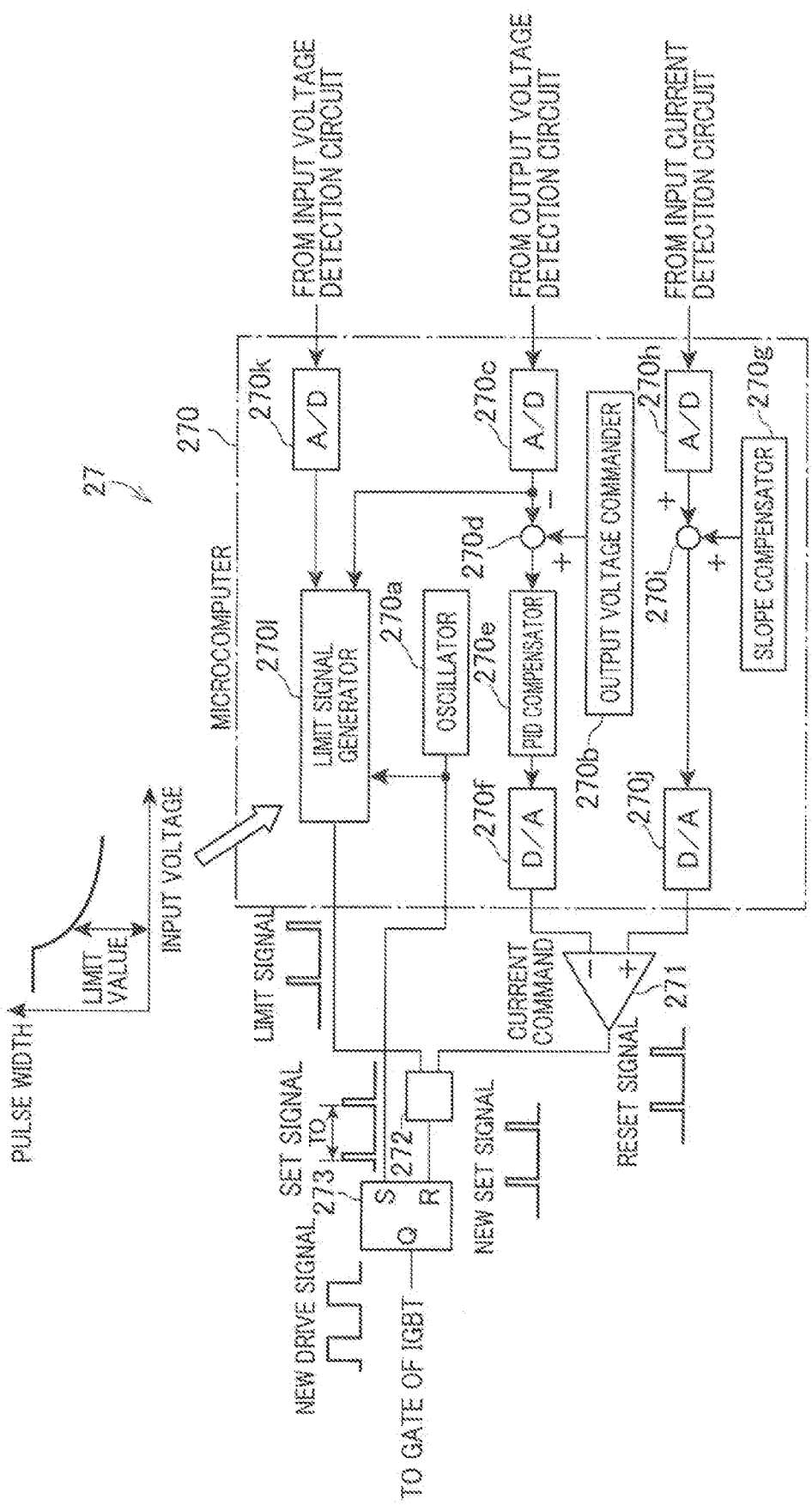
FIG. 8 is a circuit diagram illustrating a DC-DC converter according to a second embodiment of the present invention.

Referring to FIG. 8, a control circuit 27 of a DC-DC converter according to the second embodiment is described below.

FIG. 8 is a circuit diagram showing the control circuit 27. As shown in FIG. 8, the control circuit 27 includes a microcomputer 270, a comparator 271 (corresponding to the reset signal generator), a signal synthesizer circuit 272 (corresponding to the pulse-width limiter and the signal synthesizer), and an RS flip-flop 273 (corresponding to the drive signal generator).

The microcomputer 270 includes an oscillator 270*a* (corresponding to the set signal generator), an output voltage commander 270*b*, an A/D converter 270*c*, a subtractor 270*d* (corresponding to the current command generator), a PID compensator 270*e* (corresponding to the current command generator), a D/A comparator 270*f* (corresponding to the current command generator), a slope compensator 270*g*, an A/D converter 270*h*, an adder 270*i*, D/A converter 270*j*, an A/D converter 270*k*, and a limit signal generator 270*l* (corresponding to the pulse-width limiter and the limit signal generator).

The oscillator 270*a*, the A/D converters 270*c*, 270*h* and 270*k* and the D/A converters 270*f* and 270*j* are configured in the form of circuits. The output voltage commander 270*b*, the subtractor 270*d*, the PID compensator 270*e*, the slope compensator 270*g*, the adder 270*i*, and the limit signal generator 270*l* are configured in the form of programs.

The oscillator 270*a*, the output voltage commander 270*b*, the A/D converter 270*c*, the subtractor 270*d*, the PID compensator 270*e*, the D/A converter 270*f*, the slope compensator 270*g*, the A/D converter 270*h*, the adder 270*i*, the D/A converter 270*j*, and the A/D converter 270*k* are configured, respectively, similar to the oscillator 170*a*, the output voltage commander 170*b*, the A/D converter 170*c*, the subtractor 170*d*, the PID compensator 170*e*, the D/A converter 170*f*, the slope compensator 170*g*, the A/D converter 170*h*, the adder 170*i*, the D/A converter 170*j*, and the A/D converter 170*k* of the first embodiment.

The limit signal generator 270*l* is a block that determines a limit value of the pulse width of a pulse signal for turning on an IGBT, according to the outputs of the A/D converters 270*c* and 270*k*. Then, the limit signal generator 270*l* generates and outputs a limit signal after lapse of a time corresponding to the limit value with reference to the set signal.

Specifically, the limit signal generator 270*l* determines a limit value of a pulse width referring to a map. The map specifies, for each output voltage of the DC-DC converter, a relationship between: outputs of the A/D converters 270*c* and 270*k*; preset input/output voltage of the DC-DC converter; and maximum pulse width tolerable as a pulse signal for turning on an IGBT.

Then, the limit signal generator 270*l* generates and outputs a limit signal as a pulse signal after lapse of a time corresponding to the limit value with reference to the set signal. The limit signal generator 270*l* is connected to the oscillator 270*a*, the A/D converters 270*c* and 270*k*, and the signal synthesizer circuit 272.

The comparator 271 is configured similar to the comparator 171 of the first embodiment.

The signal synthesizer circuit 272 synthesizes a reset signal with a limit signal and outputs the synthesized signal as a new reset signal for generating a drive signal, excluding the reset signal outputted within a time T1 (within a predetermined time) with reference to the set signal. The time T1 here corresponds to a period from when the IGBT is turned on until when the influence of the switching noise that accompanies the switching on of the IGBT is settled.

The signal synthesizer circuit 272 has an input terminal connected to an output terminal of the comparator 271 and has another input terminal connected to the limit signal generator 270*l*. The signal synthesizer circuit 272 also has an output terminal connected to the RS flip-flop 273.

The RS flip-flop 273 is an element that generates and outputs a drive signal. The drive signal is turned on synchronizing with a set signal to turn on the IGBT, and then turned off synchronizing with a new reset signal received from the signal synthesizer circuit 272 to turn off the IGBT. Specifically, the RS flip-flop 273 generates and outputs a drive signal, which is turned on synchronizing with the rising edge of a set signal and turned off synchronizing with the rising edge of a new reset signal.

The RS flip-flop 273 has a set signal input terminal connected to an output terminal of the oscillator 270a, and a reset signal input terminal connected to an output terminal of the signal synthesizer circuit 272. The RS flip-flop 273 also has an output terminal connected to the gate of the IGBT.

Referring to FIGS. 8 to 13, hereinafter is described an operation of the DC-DC converter.

Figure 9:
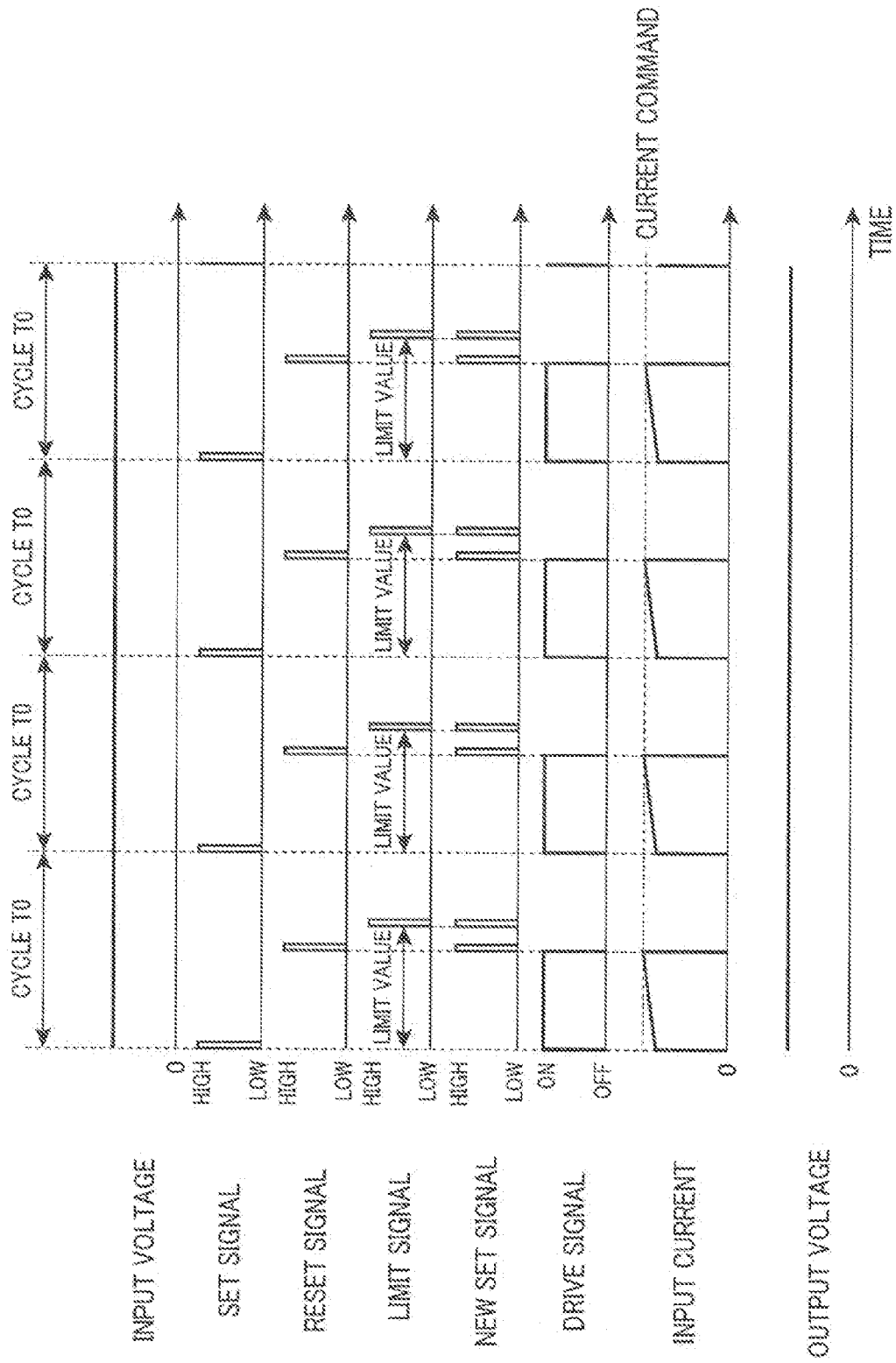
FIG. 9 is a timing diagram illustrating an operation of the DC-DC converter according to the second embodiment.

FIG. 9 is a timing diagram illustrating an operation of the DC-DC converter according to the second embodiment.

The oscillator 270a shown in FIG. 8 operates similar to the oscillator 170a of the first embodiment. As shown in FIG. 9, the oscillator 270a outputs a pulsed set signal whose signal level is high at every cycle of T0.

The output voltage commander 270b, the A/D converter 270c, the subtractor 270d, the PID compensator 270e, and the D/A converter 270f shown in FIG. 8 operate similar to the output voltage commander 170b, the A/D converter 170c, the subtractor 170d, the PID compensator 170e, and the D/A converter 170f, respectively, of the first embodiment. These components output a voltage corresponding to a current command.

The slope compensator 270g, the A/D converter 270h, the adder 270i, and the D/A converter 270j operate similar to the slope compensator 170g, the A/D converter 170h, the adder 170i, and the D/A converter 170j, respectively, of the first embodiment. These components output a slope-compensated input current as a voltage corresponding to the input current of the DC-DC converter.

The comparator 271 operates similar to the comparator 171 of the first embodiment. As shown in FIG. 9, the comparator 271 outputs a pulsed reset signal whose signal level is high when the voltage corresponding to an input current outputted from the D/A converter 270j reaches the voltage corresponding to a current command outputted from the D/A converter 270f.

The A/D converter 270k shown in FIG. 8 operates similar to the A/D converter 170k of the first embodiment. The A/D converter 270k converts a voltage corresponding to the input voltage of the DC-DC converter outputted from the input voltage detection circuit into a digital value. The limit signal generator 270l refers to a map and determines a limit value of a pulse width.

The map shows, for each output voltage of the DC-DC converter, a relationship between: a voltage corresponding to the output voltage of the DC-DC converter outputted from the A/D converter 270c; a voltage corresponding to the input voltage of the DC-DC converter outputted from the A/D converter 270k; a preset input voltage of the DC-DC converter; and a maximum pulse width tolerable as a pulse signal for turning on the IGBT. Then, as shown in FIG. 9, the limit signal generator 270l generates and outputs a limit signal as a pulse signal after lapse of a time corresponding to the limit value with reference to the set signal.

As shown in FIG. 9, the signal synthesizer circuit 272 synthesizes a reset signal with a limit signal and outputs the synthesized signal as a new reset signal for generating a drive signal.

As shown in FIG. 9, the RS flip-flop 273 generates and outputs a drive signal. The drive signal is turned on in synchronization with the rising edge of a set signal to turn on the IGBT, and then turned off in synchronisation with the rising edge of a new reset signal inputted from the signal synthesize circuit 272 to turn off the IGBT. As far as the blocks or circuits associated with generation of a reset signal are in normal operation, the output timing of a reset signal will not be delayed from the output timing of a limit signal.

Accordingly, the RS flip-flop 273 outputs a drive signal which is turned on in synchronization with the rising edge of a set signal and turned off in synchronization with the rising edge of a reset signal.

The IGBT is turned on/off according to the drive signals outputted from the RS flip-flop 273. Thus, similar to the first embodiment, the high DC voltage outputted from the high-voltage battery B10 is stepped down and the low-voltage battery B11 is charged. Thereafter, the operation described so far is repeated to maintain the voltage of the low-voltage battery at a voltage level instructed by an output voltage command.

Figure 10:
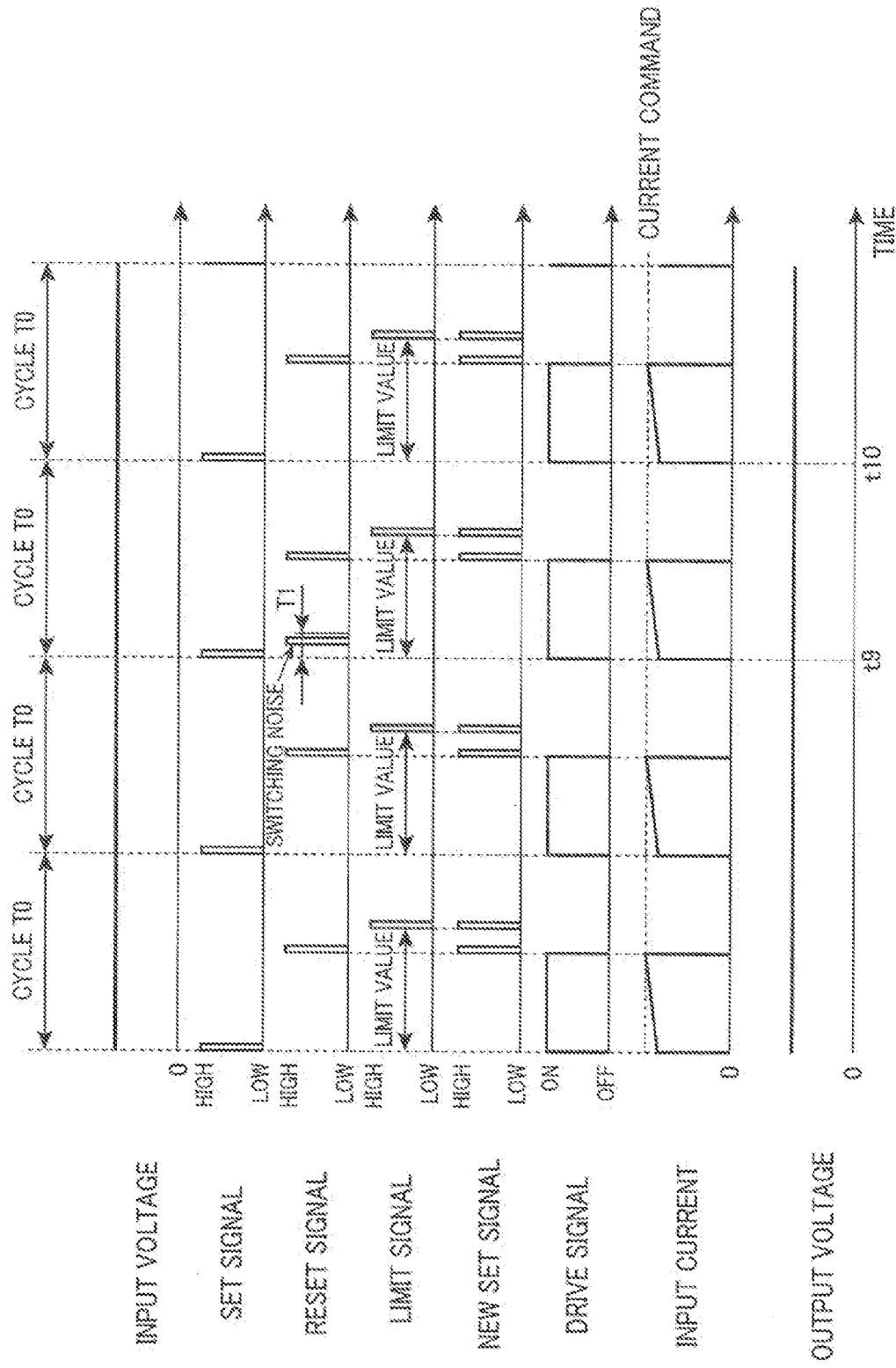
FIG. 10 is a timing diagram illustrating an operation of the DC-DC converter in the case where switching noise is superposed over the output of a comparator.

FIG. 10 is a timing diagram illustrating an operation of the DC-DC converter in the case where switching noise is superposed over the output of the comparator 271.

When the IGBT is turned on, switching noise is generated immediately after that. If the switching noise is superposed on the reset signal under the condition where the drive signal is turned off in synchronization with the reset signal as in the conventional art, the drive signal would have a smaller pulse width than it should have.

However, as shown in FIG. 10, the signal synthesizer circuit 272 synthesizes a reset signal with a limit signal, excluding the reset signal, i.e. the switching noise, outputted within the time T1 with reference to the set signal, and then outputs the synthesized signal as a new reset signal for generating a drive signal. Thus, a new reset signal is outputted without being influenced by the switching noise of the IGBT. Accordingly, a drive signal is outputted without being influenced by the switching noise of the IGBT.

Figure 11:
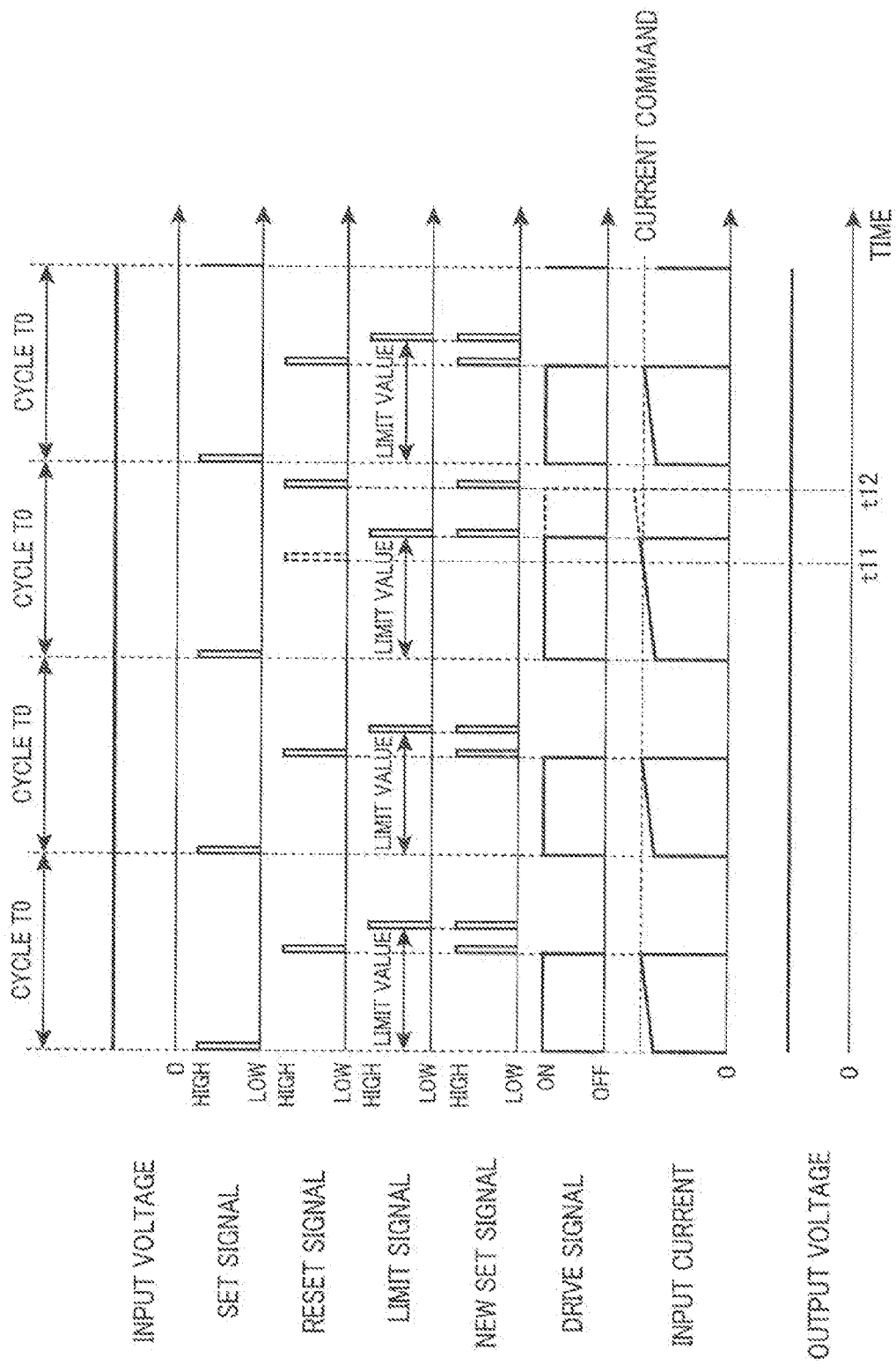
FIG. 11 is a timing diagram illustrating an operation of the DC-DC converter in the case where an output timing of a reset signal is delayed due to a failure or a malfunction.

FIG. 11 is a timing diagram illustrating an operation of the DC-DC converter in the case where an output timing of a reset signal is delayed due to a failure or a malfunction.

As shown in FIG. 11, the blocks or circuits associated with generation of a reset signal may have a failure or a malfunction to delay the output of a reset signal to time t12 from time t11 at which the reset signal should have been outputted.

In this case, the output timing of the reset signal is delayed from the output timing of a limit signal. If the IGBT is turned on/off according to the drive signals generated in synchronisation with the set signal and the reset signal as in the conventional art, the pulse width of the drive signal would become large as shown by the broken line in FIG. 11 and thus the input current of the DC-DC converter would become large.

In this regard, as shown in FIG. 11, the RS flip-flop 273 turns off the drive signal in synchronization with the limit signal whose output timing is earlier than that of the reset signal. For this reason, as shown by the solid line in FIG. 11, the pulse width of the drive signal is suppressed from becoming large and thus the input current of the DC-DC converter is prevented from becoming large.

FIG. 12 is a timing diagram illustrating an operation of the DC-DC converter in the case where a reset signal is not outputted due to a failure or a malfunction.

As shown in FIG. 12, the blocks or circuits associated with generation of a reset signal may have a failure or a malfunction and no reset signal may be outputted, which should originally have been outputted at time t13. In this case, a reset signal will not be outputted until time t14 of the subsequent cycle. If the IGBT is turned on/off according to the drive signals generated in synchronization with the set signal and the reset signal as in the conventional art, the drive signal would have an extraordinarily large pulse width, as shown by the broken line in FIG. 12, and thus the input current of the DC-DC converter would become extraordinarily large.

In this regard, as shown in FIG. 12, the RS flip-flop 273 turns off the drive signal in synchronisation with the limit signal because no reset signal is outputted at time t13. Accordingly, as shown by the solid line in FIG. 12, the pulse width of the drive signal is suppressed from becoming large and thus the input current of the DC-DC converter is suppressed from becoming large.

FIG. 13 is a timing diagram illustrating an operation of the DC-DC converter in the case where an input voltage of the DC-DC converter is rapidly increased.

As shown in FIG. 13, the input voltage of the DC-DC converter may be rapidly increased in a period from time t15 to time t16. In this case, the blocks or circuits associated with generation of a reset signal will have a delay in responding to the drastic increase, and thus the timing of outputting a reset signal will not be immediately quickened. Thus, if the IGBT is turned on/off according to the drive signals generated in synchronization with the set signal and the reset signal as in the conventional art, the pulse width of the drive signal would not be reduced, as shown by the broken line in FIG. 13, and thus the output voltage of the DC-DC converter would be increased.

In this regard, upon increase of the input, the limit signal generator 270l refers to the map voltage and immediately reduces the limit value of the pulse width. Then, the limit signal generator 270l generates and outputs a limit signal after lapse of a time corresponding to the limit value with reference to the set signal. Specifically, as shown in FIG. 13, the limit signal generator 270l immediately sets ahead the timing of outputting a limit signal with the increase of the input voltage.

Resultantly, as shown in FIG. 13, the RS flip-flop 273 turns off the drive signal in synchronisation with the limit signal which is outputted earlier than the reset signal whose output timing has not been quickened due to the response delay. Accordingly, as shown by the solid line in FIG. 13, the pulse width of the drive signal is prevented from becoming large and thus the output voltage of the DC-DC converter is prevented from being increased.

Next, advantages of the second embodiment are described below.

According to the second embodiment, even if the blocks or circuits associated with generation of a reset signal in the microcomputer 270, have a failure or a malfunction, the limit signal generator 270l and the signal synthesizer circuit 272 limit the pulse width of the drive signal. Accordingly, similar to the first embodiment, the DC-DC converter can avoid a failure caused by the overheating of the IGBT, which is ascribed to its overcurrent. Also, even if the input voltage of the DC-DC converter is rapidly increased the output voltage thereof is suppressed from being increased.

According to the second embodiment the limit signal generator 270l uses, as bases, the input and output voltages of the DC-DC converter in determining a limit value of the pulse width of a pulse signal for turning on the IGBT. Then, the limit signal generator 270l generates and outputs a limit signal after lapse of a time corresponding to the limit value with reference to the set signal. The signal synthesizer circuit 272 synthesizes a reset signal with a limit signal and outputs the synthesized signal as a new reset signal for generating a drive signal. Thus, the pulse width of the drive signal is reliably limited according to the input and output voltages.

On the other hand, when the IGBT is turned on, switching noise is generated immediately after that. If the switching noise is superposed on the reset signal under the condition where the drive signal is turned off in synchronization with a reset signal as in the conventional art, the drive signal would inevitably have a pulse width smaller than the pulse width it should have.

In this regard, according to the second embodiment, the signal synthesizer circuit 272 synthesizes a reset signal with a limit signal, excluding the reset signal, i.e. the switching noise, outputted within the time T1 with reference to the set signal, and then outputs the synthesized signal as a new reset signal for generating a drive signal. Thus, a new reset signal is outputted without being influenced by the switching noise. Accordingly, a drive signal is outputted without being influenced by the switching noise.

The first and second embodiments exemplify that the limit signal generator determines the limit value of a pulse width according to the input and output voltages of the DC-DC converter. However, this should not impose a limitation. Since the output voltage is controlled to be the voltage instructed by the output voltage command, the limit signal generator may determine a limit value of a pulse width according to the input voltage and the output voltage command.

The first and second embodiments exemplify that the limit signal generator determines the limit value of a pulse width referring to a preset map. However, this should not impose a limitation. The limit value may be calculated on the basis of the input and output voltages of the DC-DC converter.

The first and second embodiments exemplify the DC-DC converter that steps down the high DC voltage outputted from the high-voltage battery to charge the low-voltage battery. However, this should not impose a limitation. The DC-DC converter may step up a low DC voltage. Alternatively, the DC-DC converter may step up and down low and high DC voltages in both ways. Further, if only an apparatus converts a voltage by turning on/off a switching element, the present invention may be applied to the apparatus whatever configuration the apparatus may have, such as a non-insulated configuration or an insulated configuration.

The first and second embodiments exemplify that the element for passing flywheel current is composed of a diode. However, this should not impose a limitation. The diode may be replaced by a switching element. In this case, the replaced switching element and the IGBT may be turned on/off in a complementary manner to realize the similar operation described in the first and second embodiments. In other words, the present invention may be applied to a DC-DC converter including a plurality of switching elements.

The first and second embodiments exemplify that the input current detection circuit is provided on a line that connects the negative terminal of the capacitor and the anode of the diode to the high-voltage battery. However, this should not impose a limitation. The input current detection circuit may be provided on a line connected to an end or the other end of the IGBT to detect a current passing through the coil as the input current.

The first and second embodiments exemplify that an input current value and a slope compensation value are added, as a digital value, in the microcomputer. However, this should not impose a limitation. The input current-value and the slope compensation value may be added, as an analog value, outside the microcomputer, and then, the analog value may be digitized in the microcomputer.

What is claimed is:

1. A power converter, comprising:
a switching element that is driven to be turned on/off for converting one voltage to another; and a control circuit that controls driving of the switching element, wherein:

the control circuit includes:
- a set signal generator that generates a set signal at every predetermined cycle;
- a current command generator that generates a current command based on an output voltage command and an output voltage outputted from the power converter;
- a reset signal generator that generates a reset signal based on an input current inputted to the power converter and the generated current command;
- a drive signal generator that generates a drive signal which turns on in synchronization with the generated set signal to thereby turn on the switching element, and which turns off in synchronization with the subsequently generated reset signal to thereby turn off the switching element; and
- a pulse-width limiter that limits a pulse-width of the drive signal according to an input voltage inputted to the power converter and the output voltage, or according to the input voltage and the output voltage command, the pulse-width limiter includes:
- a limit signal generator that determines a limit value of the pulse-width according to the input voltage and the output voltage, or according to the input voltage and the output voltage command, and that generates a limit signal which turns on in synchronization with the set signal and has a pulse-width which defines the limit value; and
- a signal selector that selects the drive signal or the limit signal, whichever has a smaller pulse width, and outputs the selected signal as a new drive signal for driving the switching element.

2. The power converter according to claim 1, wherein the signal selector excludes the drive signal having a pulse width of a predetermined value or less, selects the drive signal or the limit signal, whichever has a smaller pulse width, and outputs the selected signal as the new drive signal for driving the switching element.

3. The power converter according to claim 1, wherein the power converter is installed in a vehicle.

4. The power converter according to claim 1, further comprising:
- an input voltage detection circuit that detects the input voltage of the power converter, converts the detected input voltage to a voltage that can be inputted to the control circuit and outputs the converted voltage to the control circuit;
- an input current detection circuit that detects the input current of the power converter, converts the detected input current to a voltage that can be inputted to the control circuit, and outputs the converted voltage to the control circuit; and
- an output voltage detection circuit that detects the output voltage of the power converter, converts the detected output voltage to a voltage that can be inputted to the control circuit, and outputs the converted voltage to the control circuit.

5. A power converter, comprising:
a switching element that is driven to be turned on/off for converting one voltage to another; and
a control circuit that controls driving of the switching element, wherein:

the control circuit includes:
- a set signal generator that generates a set signal at every predetermined cycle;
- a current command generator that generates a current command based on an output voltage command and an output voltage outputted from the power converter;
- a reset signal generator that generates a reset signal based on an input current inputted to the power converter and the generated current command;
- a drive signal generator that generates a drive signal which turns on in synchronization with the generated set signal to thereby turn on the switching element, and which turns off in synchronization with the subsequently generated reset signal to thereby turn off the switching element; and
- a pulse-width limiter that limits a pulse-width of the drive signal according to an input voltage inputted to the power converter and the output voltage, or according to the input voltage and the output voltage command, the pulse-width limiter includes:
- a limit signal generator that determines a limit value of the pulse-width according to the input voltage and the output voltage, or according to the input voltage and the output voltage command, and that generates a limit signal when a predetermined period with reference to the set signal elapses; and
- a signal synthesizer that synthesizes the reset signal with the limit signal and outputs the synthesized signal as a new reset signal for generating the drive signal.

6. The power converter according to claim 5, wherein the signal synthesizer excludes the reset signal outputted within the predetermined period with reference to the set signal, synthesizes the reset signal with the limit signal, and outputs the synthesized signal as the new reset signal for generating the drive signal.

7. The power converter according to claim 5, wherein the power converter is installed in a vehicle.

8. The power converter according to claim 5, further comprising:
- an input voltage detection circuit that detects the input voltage of the power converter, converts the detected input voltage to a voltage that can be inputted to the control circuit and outputs the converted voltage to the control circuit;
- an input current detection circuit that detects the input current of the power converter, converts the detected input current to a voltage that can be inputted to the control circuit, and outputs the converted voltage to the control circuit; and
- an output voltage detection circuit that detects the output voltage of the power converter, converts the detected output voltage to a voltage that can be inputted to the control circuit, and outputs the converted voltage to the control circuit.

9. A control circuit for a power converter including a switching element that is driven to be turned on/off for converting one voltage to another, the control circuit comprising:
- a set signal generator that generates a set signal at every predetermined cycle;
- a current command generator that generates a current command based on an output voltage command and an output voltage outputted from the power converter;
- a reset signal generator that generates a reset signal based on an input current inputted to the power converter and the generated current command;
- a drive signal generator that generates a drive signal which turns on in synchronization with the generated set signal to thereby turn on the switching element, and which turns off in synchronization with the subsequently generated reset signal to thereby turn off the switching element; and a pulse-width limiter that limits a pulse-width of the drive signal according to an input voltage inputted to the power converter and the output voltage, or according to the input voltage and the output voltage command, wherein:

the pulse-width limiter includes:

a limit signal generator that determines a limit value of the pulse-width according to the input voltage and the output voltage, or according to the input voltage and the output voltage command, and that generates a limit signal which turns on in synchronization with the set signal and has a pulse-width which defines the limit value; and a signal selector that selects the drive signal or the limit signal, whichever has a smaller pulse width, and outputs the selected signal as a new drive signal for driving the switching element.

10. The control circuit according to claim 9, wherein the signal selector excludes the drive signal having a pulse width of a predetermined value or less, selects the drive signal or the limit signal, whichever has a smaller pulse width, and outputs the selected signal as the new drive signal for driving the switching element.

11. The control circuit according to claim 9, wherein the power converter is installed in a vehicle.

12. A control circuit for a power converter including a switching element that is driven to be turned on/off for converting one voltage to another, the control circuit comprising:

a set signal generator that generates a set signal at every predetermined cycle;

a current command generator that generates a current command based on an output voltage command and an output voltage outputted from the power converter;

a reset signal generator that generates a reset signal based on an input current inputted to the power converter and the generated current command;

a drive signal generator that generates a drive signal which turns on in synchronization with the generated set signal to thereby turn on the switching element, and which turns off in synchronization with the subsequently generated reset signal to thereby turn off the switching element; and a pulse-width limiter that limits a pulse-width of the drive signal according to an input voltage inputted to the power converter and the output voltage, or according to the input voltage and the output voltage command, wherein:

the pulse-width limiter includes:

a limit signal generator that determines a limit value of the pulse-width according to the input voltage and the output voltage, or according to the input voltage and the output voltage command, and that generates a limit signal when a predetermined period with reference to the set signal elapses; and a signal synthesizer that synthesizes the reset signal with the limit signal and outputs the synthesized signal as a new reset signal for generating the drive signal.

13. The control circuit according to claim 12, wherein the signal synthesizer synthesizes the reset signal with the limit signal, excluding the reset signal outputted within the predetermined period with reference to the set signal, and outputs the synthesized signal as the new reset signal for generating the drive signal.

14. The control circuit according to claim 12, wherein the power converter is installed in a vehicle.

15. A control method for a power converter including a switching element that is driven to be turned on/off for converting one voltage to another, the control method comprising the steps of:

generating a set signal at every predetermined cycle;

generating a current command based on an output voltage command and an output voltage outputted from the power converter;

generating a reset signal based on an input current inputted to the power converter and the generated current command;

generating a drive signal which turns on in synchronization with the generated set signal to thereby turn on the switching element, and which turns off in synchronization with the subsequently generated reset signal to thereby turn off the switching element; and limiting a pulse-width of the drive signal according to an input voltage inputted to the power converter and the output voltage, or according to the input voltage and the output voltage command, wherein:

the step of limiting includes the steps of:

determining a limit value of the pulse-width according to the input voltage and the output voltage, or according to the input voltage and the output voltage command, and generating a limit signal which turns on in synchronization with the set signal and has a pulse-width which defines the limit value; and selecting the drive signal or the limit signal, whichever has a smaller pulse width, and outputting the selected signal as a new drive signal for driving the switching element.

16. The control method according to claim 15, wherein the step of selecting excludes the drive signal having a pulse width of a predetermined value or less, selects the drive signal or the limit signal, whichever has a smaller pulse width, and outputs the selected signal as the new drive signal for driving the switching element.

17. The control method according to claim 15, wherein the power converter is installed in a vehicle.

18. A control method for a power converter including a switching element that is driven to be turned on/off for converting one voltage to another, the control method comprising the steps of:

generating a set signal at every predetermined cycle;

generating a current command based on an output voltage command and an output voltage outputted from the power converter;

generating a reset signal based on an input current inputted to the power converter and the generated current command;

generating a drive signal which turns on in synchronization with the generated set signal to thereby turn on the switching element, and which turns off in synchronization with the subsequently generated reset signal to thereby turn off the switching element; and limiting a pulse-width of the drive signal according to an input voltage inputted to the power converter and the output voltage, or according to the input voltage and the output voltage command, wherein:

the step of limiting includes the steps of:

determining a limit value of the pulse-width according to the input voltage and the output voltage, or according to the input voltage and the output voltage command, and generating a limit signal when a predetermined period with reference to the set signal elapses; and synthesizing the reset signal with the limit signal and outputting the synthesized signal as a new reset signal for generating the drive signal.

19. The control method according to claim 18, wherein the step of synthesizing excludes the reset signal outputted within the predetermined period with reference to the set signal, synthesizes the reset signal with the limit signal, and outputs the synthesized signal as the new reset signal for generating the drive signal.

20. The control method according to claim 18, wherein the power converter is installed in a vehicle.

* * * * *